(12) United States Patent
Reding et al.

(10) Patent No.: US 7,836,147 B2
(45) Date of Patent: Nov. 16, 2010

(54) METHOD AND APPARATUS FOR ADDRESS BOOK CONTACT SHARING

(75) Inventors: Craig L. Reding, Midland Park, NJ (US); Ashutosh K. Sureka, Irving, TX (US); Sandeep Chakravarty, Dallas, TX (US); Paula A. Dromlewiez, Jefferson, MA (US); Christopher J. Helbling, Stamford, CT (US); Shuchi R. Patel, Irving, TX (US); John R. Reformato, Tarrytown, NJ (US)

(73) Assignees: Verizon Data Services LLC, Ashburn, VA (US); Verizon Services Corp., Ashburn, VA (US); Verizon Business Financial Management Corporation, Ashburn, VA (US)

( * ) Notice: Subject to any disclaimer, the term of this patent is extended or adjusted under 35 U.S.C. 154(b) by 541 days.

(21) Appl. No.: 11/465,004

(22) Filed: Aug. 16, 2006

(65) Prior Publication Data

US 2007/0038720 A1    Feb. 15, 2007

Related U.S. Application Data

(63) Continuation-in-part of application No. 10/720,784, filed on Nov. 24, 2003, and a continuation-in-part of application No. 10/083,793, filed on Feb. 27, 2002, and a continuation-in-part of application No. 10/083,792, filed on Feb. 27, 2002, now Pat. No. 7,142,646, and a continuation-in-part of application No. 10/083,884, filed on Feb. 27, 2002, now Pat. No. 7,190,773, and a continuation-in-part of application No. 10/083,822, filed on Feb. 27, 2002.

(60) Provisional application No. 60/428,704, filed on Nov. 25, 2002, provisional application No. 60/436,018, filed on Dec. 26, 2002, provisional application No. 60/272,122, filed on Feb. 27, 2001, provisional application No. 60/272,167, filed on Feb. 27, 2001, provisional application No. 60/275,667, filed on Mar. 13, 2001, provisional application No. 60/275,719, filed on Mar. 13, 2001, provisional application No. 60/275,020, filed on Mar. 13, 2001, provisional application No. 60/275,031, filed on Mar. 13, 2001, provisional application No. 60/276,505, filed on Mar. 19, 2001.

(51) Int. Cl.
*G06F 15/16* (2006.01)

(52) U.S. Cl. .................. 709/217; 379/211; 379/218; 379/223; 709/206; 709/219

(58) Field of Classification Search .................. 709/249
See application file for complete search history.

(56) References Cited

U.S. PATENT DOCUMENTS 5,818,442 A * 10/1998 Adamson ................. 715/753

(Continued)

*Primary Examiner*—Firmin Backer
*Assistant Examiner*—Natisha Cox

(57) ABSTRACT

An exemplary method and apparatus for facilitating contact sharing between users of a communication network are described. The method may include maintaining contact information in first and second address books associated with first and second users, respectively, and forwarding, from the first user to the second user, a request to copy contact information from the first address book to the second address book. The method may further include receiving a confirmation from the second user in response to the request, and copying the contact information from the first address book to the second address book in response to the confirmation.

15 Claims, 13 Drawing Sheets

U.S. PATENT DOCUMENTS

| | | | |
|---|---|---|---|
| 6,044,205 A * | 3/2000 | Reed et al. | 709/201 |
| 6,269,369 B1 * | 7/2001 | Robertson | 707/10 |
| 6,633,311 B1 * | 10/2003 | Douvikas et al. | 715/731 |
| 6,671,757 B1 * | 12/2003 | Multer et al. | 710/100 |
| 6,944,651 B2 * | 9/2005 | Onyon et al. | 709/217 |
| 7,007,068 B2 * | 2/2006 | Morkel | 709/206 |
| 7,343,415 B2 * | 3/2008 | Kenner et al. | 709/227 |
| 2002/0016857 A1 * | 2/2002 | Harari | 709/238 |
| 2002/0049751 A1 * | 4/2002 | Chen et al. | 707/3 |
| 2002/0054596 A1 * | 5/2002 | Sengodan | 370/395.21 |
| 2002/0055351 A1 * | 5/2002 | Elsey et al. | 455/414 |
| 2002/0156895 A1 * | 10/2002 | Brown | 709/226 |
| 2002/0174188 A1 * | 11/2002 | Clark et al. | 709/213 |
| 2003/0148758 A1 * | 8/2003 | McMullin | 455/415 |
| 2004/0148506 A1 * | 7/2004 | Prince | 713/176 |
| 2005/0255838 A1 * | 11/2005 | Adams et al. | 455/418 |
| 2006/0174017 A1 * | 8/2006 | Robertson | 709/229 |
| 2007/0236350 A1 * | 10/2007 | Nystrom et al. | 340/572.1 |

* cited by examiner

METHOD AND APPARATUS FOR ADDRESS BOOK CONTACT SHARING

CROSS-REFERENCE TO RELATED APPLICATIONS

This application is a continuation-in-part of U.S. patent application Ser. No. 10/720,784, entitled "METHODS AND SYSTEMS FOR CONTACT MANAGEMENT," filed Nov. 24, 2003, (which claims priority to U.S. Provisional Patent Application Nos. 60/428,704 and 60/436,018, filed Nov. 25, 2002, and Dec. 26, 2002, respectively), which is a continuation-in-part of U.S. patent application Ser. No. 10/083,793, entitled "METHOD AND APPARATUS FOR CALENDARED COMMUNICATIONS FLOW CONTROL," filed Feb. 27, 2002; U.S. patent application Ser. No. 10/083,792, entitled "VOICE MAIL INTEGRATION WITH INSTANT MESSENGER," filed Feb. 27, 2002; U.S. patent application Ser. No. 10/083,884, entitled "DEVICE INDEPENDENT CALLER ID," filed Feb. 27, 2002; and U.S. patent application Ser. No. 10/083,822, entitled "METHOD AND APPARATUS FOR UNIFIED COMMUNICATION MANAGEMENT VIA INSTANT MESSAGING," filed Feb. 27, 2002 (all of which claim priority to U.S. Provisional Patent Application Nos. 60/272,122, 60/272,167, 60/275,667, 60/275,719, 60/275,020, 60/275,031 and 60/276,505), all of which are expressly incorporated herein by reference in their entirety.

BACKGROUND INFORMATION

A wide variety of means exist for communication between users. For example, a user may conduct phone calls via a home phone, work phone, and mobile phone. In addition, users may also communicate using devices such as PC's, PDA's, pagers, etc. using manners of communicating as email and instant messaging.

Unfortunately, managing such a wide variety of communication means can be difficult. In particular, as a user changes location, communication with the user may vary. For example, while on travel, it may only be possible to reach a user by mobile phone. However, the user may best be reached by email while at work. Also, the user may wish to implement various rules for receiving and controlling communications. For example, to be reached at home, the user may want the home phone to ring three times before forwarding the call to a mobile phone. As another example, the user may wish to be paged each time an email is received from a particular person while away from the office.

Typically, to implement communication management, a person must individually manage each communication device separately. Thus, when the user wishes to change how communication is managed, the user may have to deal with numerous devices and, perhaps, service centers.

Further, call management is becoming increasingly difficult given the expanding array of available communication devices and services. Conventional communication systems provide users with limited contact management features. One common option in conventional systems is "Caller ID," which enables a receiving party to view a calling party's telephone number. Certain systems (e.g., digital cell phones) allow users to locally store phone numbers in a contact list, which is usually a FIFO or rolling list with limited storage capacity. In such systems, the user typically must perform an action to insert phone numbers in the contact list. For example, in a cell phone, the user must enter in phone numbers via a keypad and instruct the device to save the entered numbers. Certain systems may automatically store all outgoing and incoming calls in a rolling list as they are dialed and received; however, such systems typically provide limited FIFO storage and usually store only the numbers. Further, current systems do not allow users to retrieve contact information from a calling party number on demand and to add contact information to a contact list. Also, current communication systems do not enable users to add contacts to a contact list from several sources and devices (e.g., Caller-ID, bills, call history, cell phones, laptops, PDAs, J2ME phones, BREW phones, etc.).

Methods, systems, and articles of manufacture consistent with certain embodiments of the present invention are directed to obviating one or more of the issues set forth above.

DETAILED DESCRIPTION OF PREFERRED EMBODIMENTS

Figure 1:
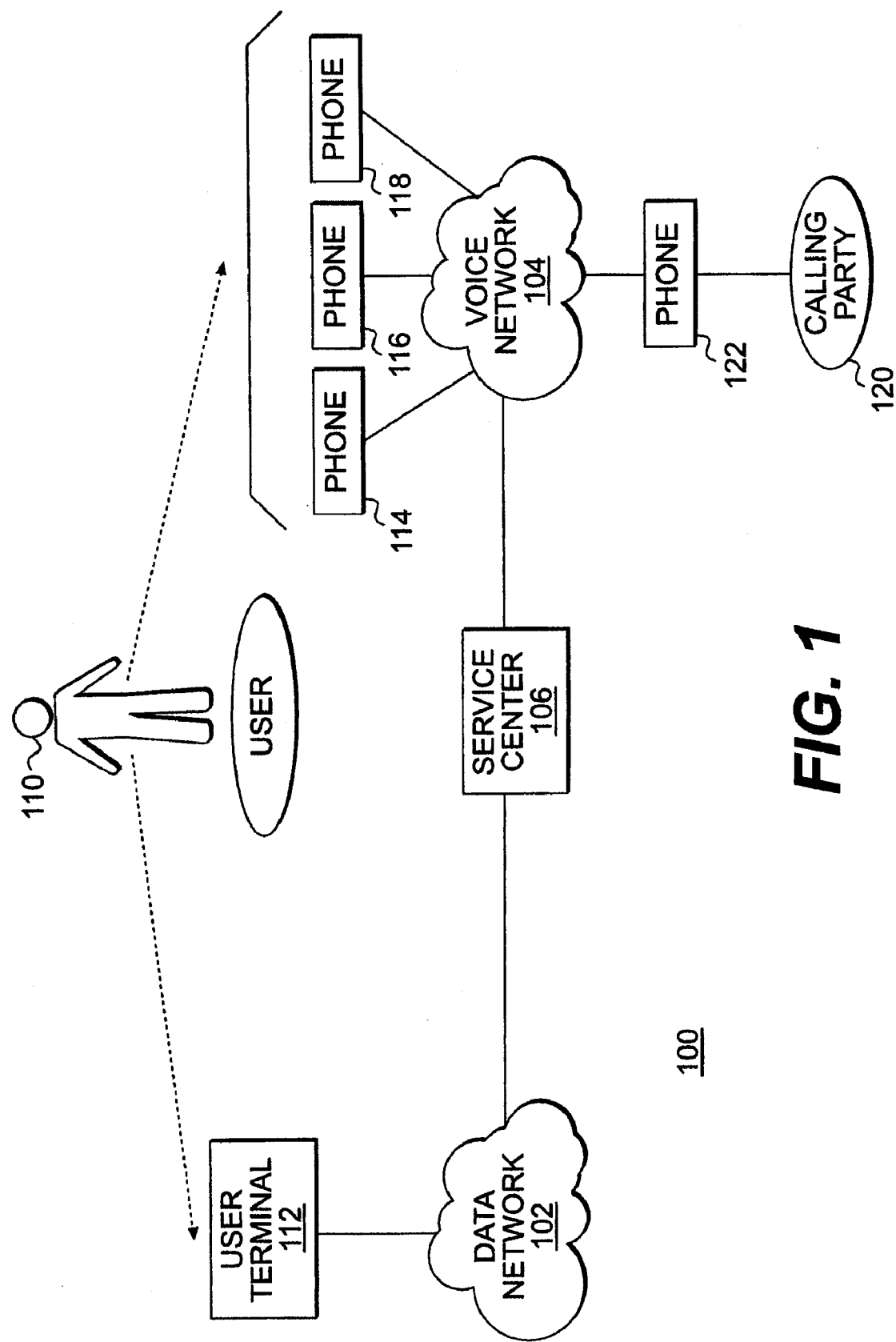
FIG. 1 is a diagram of an exemplary data processing and telecommunications environment in which features and aspects consistent with the principals of the present invention may be implemented.

Preferred methods and systems implemented consistent with the present invention may provide an address book or contact list facility and may enable contacts to be added to the address book from various contact sources. Additional details of such an address book/contact list facility are described below in connection with FIG. 6. As used herein, the term "contact source" refers to any resource from which a contact may be selected and/or obtained for addition to the address book. In certain embodiments, a "contact source" may include a compilation of data representing one or more communications between a user and other parties. Contact sources may include incoming call histories, outgoing call histories, account statements, billing statements, a CID display, e-mail logs, facsimile transmission logs, cell phone records, etc. In certain embodiments of the present invention, such contact sources may be accessible to the user, and the user may select contacts from such contact sources for addition to the address book. In addition, or as an alternative, contact sources may be accessible to one or more systems (e.g., service center 106), and such systems may access the sources to add contacts to the address book.

In the preferred embodiments, adding a contact to the address book may involve inserting contact-related information associated with the particular contact in the address book. Contact-related information may include one or more of a name, home address, business address, home telephone number, business telephone number, cell phone number, instant messenger address, IP address, biometric information (e.g., fingerprints, voice prints, retinal scans, etc.) visual information (e.g., digital images, photographs, etc.), audio information, personal information (e.g., birth date, favorite movies, favorite songs, etc.), public records, credit reports, police records, driving records, banking statements, and contact-related information associated with relatives and/or friends. In certain embodiments, contact-related information may include information associated with, or retrieved via, one or more networks. Contact information may be retrieved or obtained from one or more systems, networks, and/or service providers associated with a particular user (e.g., service center 106).

In one embodiment of the present invention, contacts may be automatically added to the address book, with or without the user's input. For example, the address book may be periodically updated or dynamically updated in response to changes in contact-related information. In addition, or as an alternative, the user could cause a contact to be added to the address book. For example, a user could select a caller from a monthly billing statement or call history to add to the address book. Further, a user could specify a contact to add to the address book by for, example, inputting a name and/or number to a user terminal. Methods and systems of the present invention may use the specified name or number to retrieve contact information that may be added to the address book.

Reference will now be made in detail to certain exemplary embodiments, examples of which are illustrated in the accompanying drawings. Wherever possible, the same reference numbers will be used throughout the figures to refer to the same or like elements. The accompanying figures illustrate exemplary embodiments and implementations consistent with the present invention, but the description of those embodiments does not indicate or imply that other embodiments or implementations do not fall within the scope of present invention as set forth by the attached claims. It is to be understood that other implementations may be utilized and that structural and method changes may be made without departing from the scope of present invention as set forth in the attached claims.

FIG. 1 is a block diagram of a data processing and telecommunications environment 100, in which the preferred embodiments described herein may be implemented. The number of components in environment 100 is not limited to what is shown and other variations in the number of arrangements of components are possible. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use phones 114, 116, and 118 to interface with voice network 104. A calling party 120 may use phone 122 to call a user, such as user 110, at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a wide area network (WAN), local area network (LAN), an intranet and/or the Internet. Further, the service center 106 may be connected to multiple data networks 102, such as, for example, to a wireless carrier network and to the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented using voice-over Internet Protocol ("VoIP") technology. In addition, voice network 104 may be implemented using both PSTN and VoIP technology consistent with the principles of the present invention. Further, service center 106 may be connected to multiple voice networks 104, such as for example, Verizon's™ Voice Network, voice networks operated by other carriers, and wireless carrier networks.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, and/or firmware. For example, service center 106 may be implemented using one or more general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. In addition, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Furthermore, user terminal 112 may communicate directly with service center 106. For example, a client application may be installed on user terminal 112, which directly communicates with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
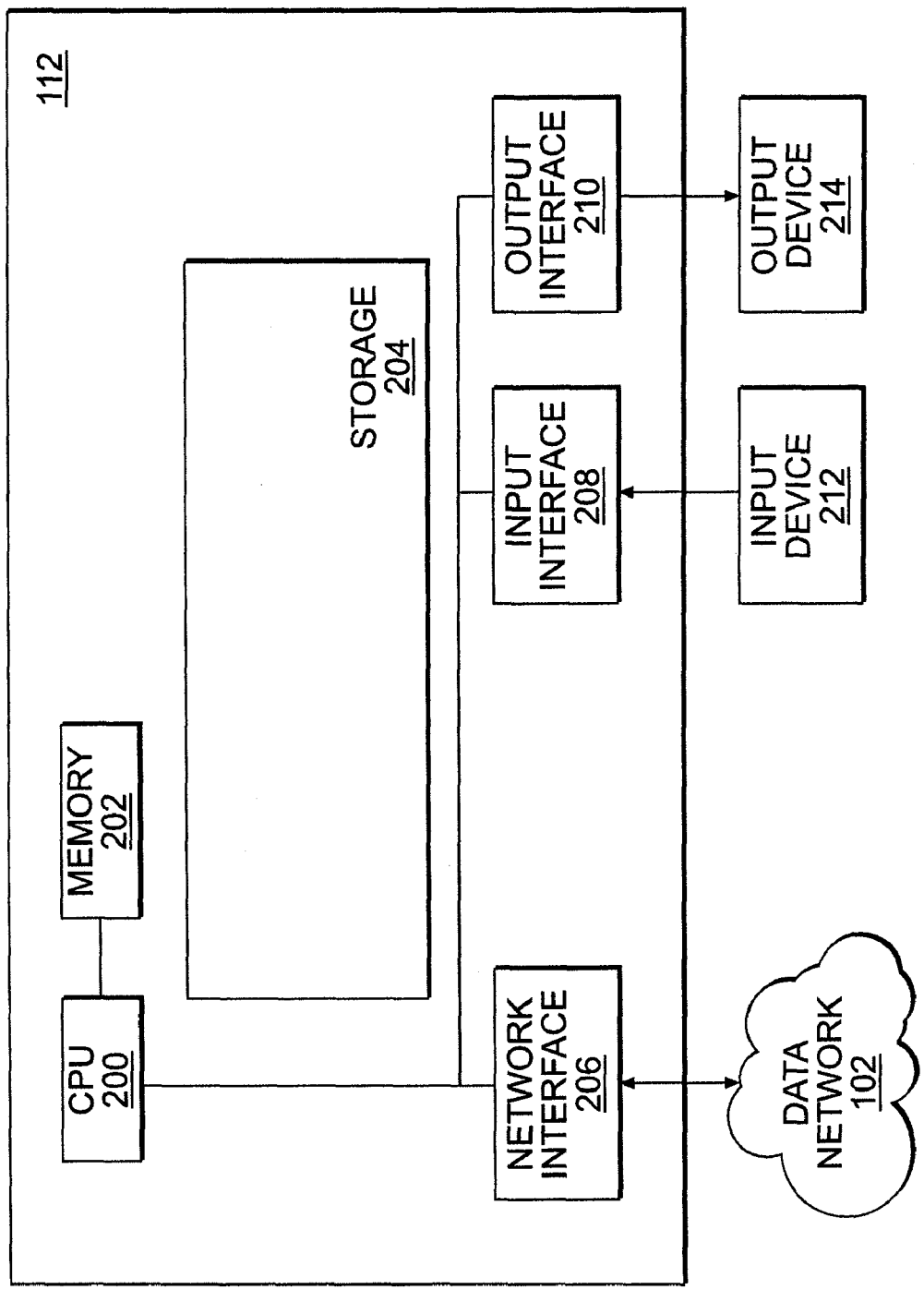
FIG. 2 is a diagram of an exemplary user terminal, consistent with the principals of the present invention.

FIG. 2 is a block diagram of a user terminal consistent with the present invention. User terminal 112 includes a central processing unit (CPU) 200, a memory 202, a storage module 204, a network interface 206, an input interface 208, an output interface 210, an input device 216, and an output device 218.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium™ processor provided from Intel Corporation.

Memory 202 provides a memory for program code for CPU 200. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service (MSNMS) client or America Online Instant Messenger (AIM) client; and an Operating System (OS), such as the Windows Operation System provided by Microsoft Corporation. In addition, storage module 204 may include other program code and information, such as program code for TCP/IP communications; kernel and device drivers; configuration information, such as a Dynamic Host Configuration Protocol (DHCP) configuration; a web browser, such as Internet Explorer provided by Microsoft Corporation, or Netscape Communicator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention. Input interface 208 thus constitutes a point at which a user interacts with user terminal 112.

Output interface 210 provides information to user 110 via output device 214. Output device 214 may include, for example, a display, a printer, and a speaker. Other types of output devices may also be implemented consistent with the principles of the present invention. Output interface 210 similarly constitutes a point at which a user interacts with user terminal 112.

Figure 3:
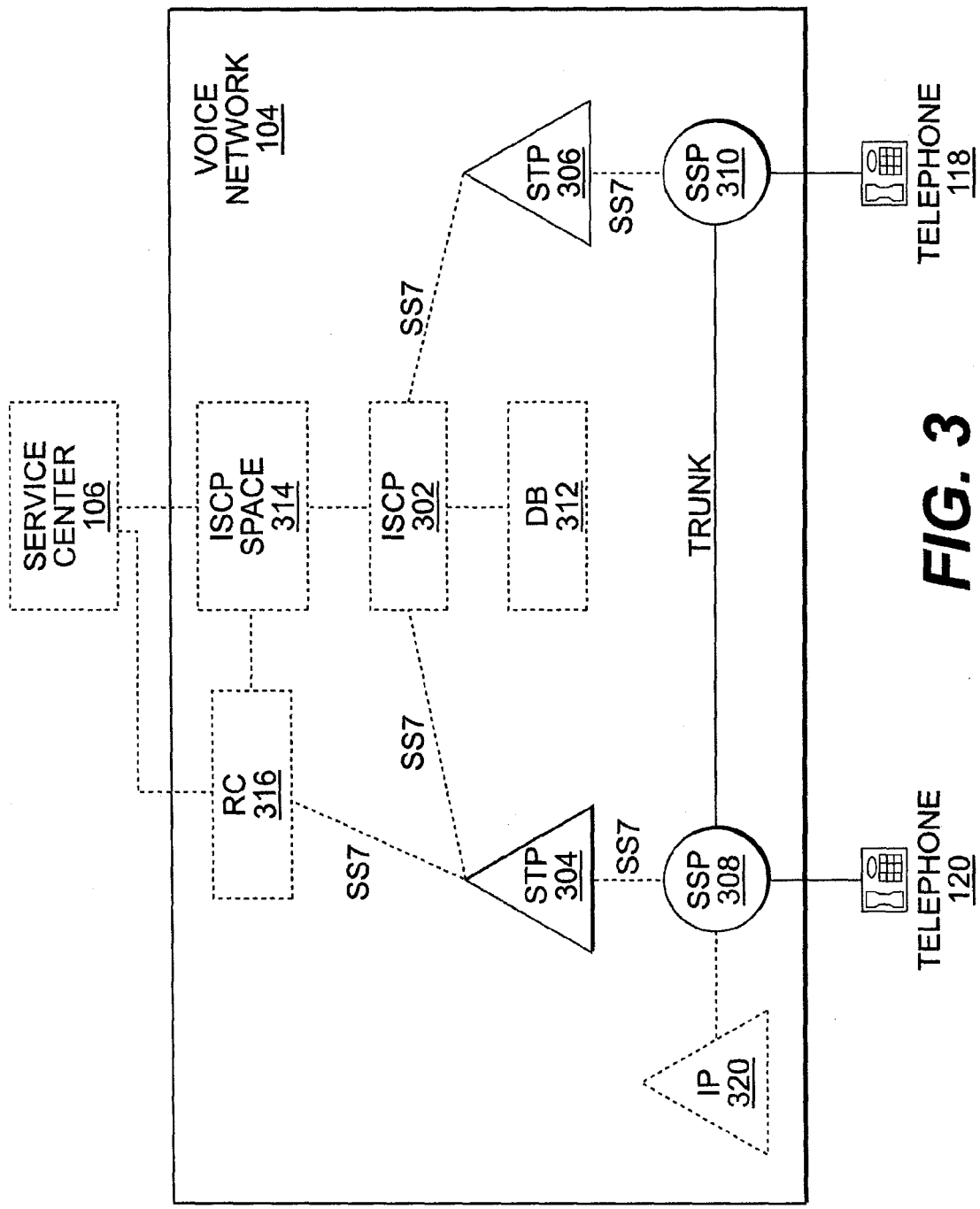
FIG. 3 is a diagram of a voice network, consistent with the principles of the present invention.

FIG. 3 is a diagram of a voice network, consistent with the principles of the present invention. As shown, voice network 104 includes an intelligent service control point (ISCP) 302, service transfer points (STP) 304 and 306, service switching points (SSP) 308 and 310, a line information database (LIDB) 312, an ISCP Service Provisioning And Creation Environment (SPACE) 314, a Recent Change Environment 316, and an Intelligent Peripheral (IP) 320.

Voice network 104 may be implemented using the PSTN and SS7 as a signaling protocol. The SS7 protocol allows voice network 104 to provide features, such as call forwarding, caller-ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point (SCP) or an Advanced Intelligent Network (AIN) SCP. ISCP 302 provides translation and routing services of SS7 messages to support the features of voice network 104, such as call forwarding. In addition, ISCP 302 may exchange information with the service center 106 using TCP/IP or SS7. ISCP 302 may be implemented using a combination of known hardware and software. Although ISCP 302 is shown with a direct connection to service center 106 through ISCP SPACE 314, any number of network elements including routers, switches, hubs, etc., may be used to connect ISCP 302 and service center 106.

STPs 304 and 306 relay SS7 messages within voice network 104. For example, STP 304 may route SS7 messages between SSPs 308 and 310. STP 302 may be implemented using known hardware and software from manufacturers such as NORTEL™ and LUCENT Technologies™.

SSPs 308 and 310 provide an interface between voice network 104 and phone 114 and calling party 120, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 and user 110. For example, SSPs 308 and 310 may exchange SS7 messages, such as TCAP messages, within message signal units ("MSU") to control calls, perform database queries to configuration database 312, and provide maintenance information.

Line Information Database (LIDB) 312 comprises one or more known databases to support the features of voice network 104. For example, LIDB 312 may include subscriber information, such as a service profile, name and address, and credit card validation information.

ISCP Service Provisioning and Creation Environment (SPACE) 314 may be included as part of ISCP 302 or be separate from ISCP 302. For example, the Telcordia™ ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in ISCP SPACE 314 such that the records may be updated and sent to ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, voice network 104 may include one or more recent change engines 316 such as, for example, an Enterprise Recent Change engine (eRC); an Assignment, Activation, and Inventory System (AIS); or a multi-services platform (MSP). As an example, the eRC and AIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP may be used, for example, for providing updates to both SSPs 308 or 310 and ISCPs 302. Or, for example, an eRC may be used for providing updates to SSPs 308 or 310, while an AIS is used for providing updates to ISCPs 302.

Additionally, voice network 104 may include one or more intelligent peripherals (IP). For example, in FIG. 4, an IP 320 is illustrated as being connected to SSP 308. These IPs may be used for providing services, such as voice mail services.

Figure 4:
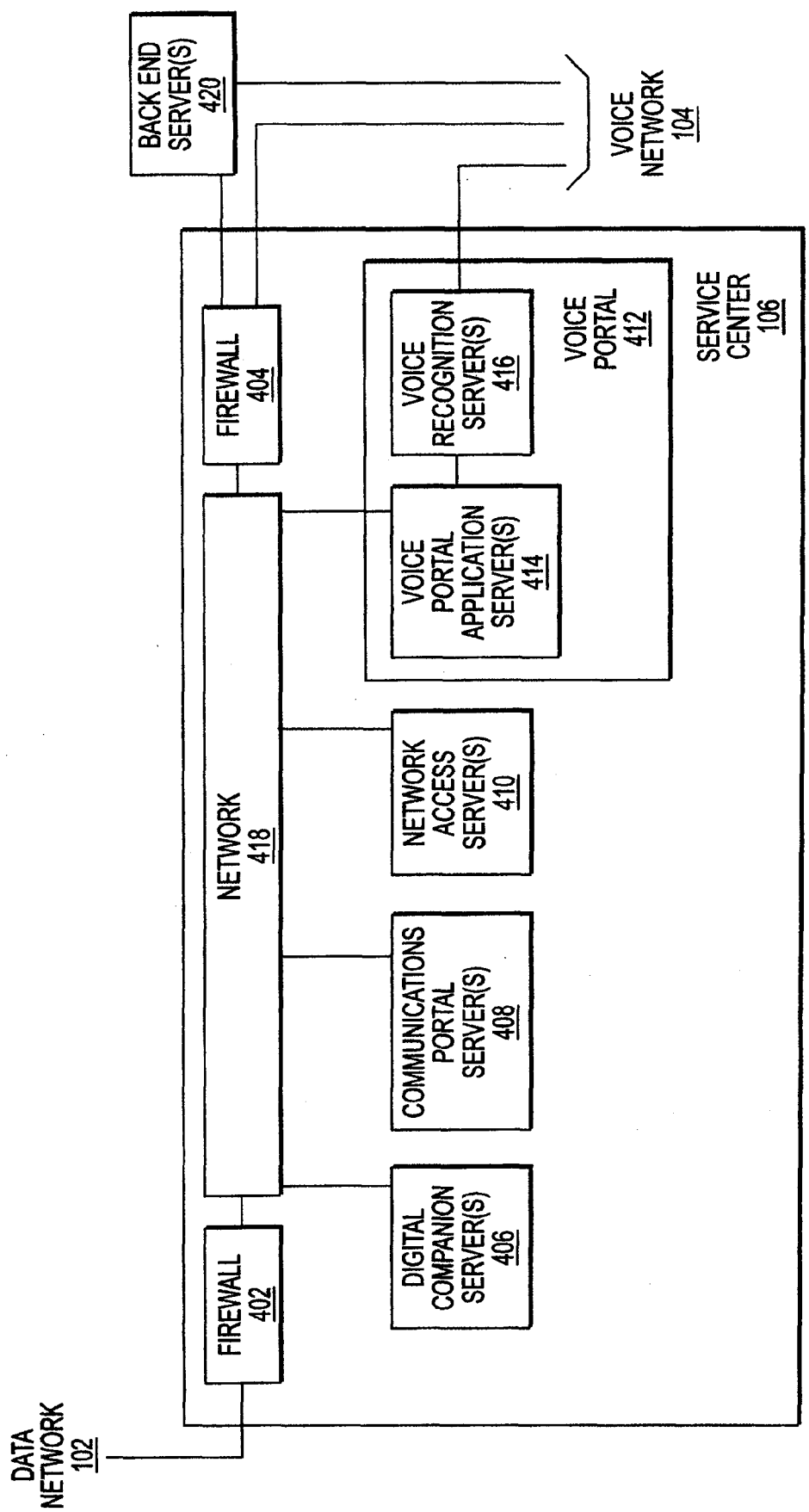
FIG. 4 is a block diagram of a service center, consistent with the principles of the present invention.

FIG. 4 is a block diagram of a service center, consistent with the principles of the present invention. As shown, service center 106 may include firewalls 402 and 404, one or more digital companion servers 406, one or more communication portal servers 408, one or more network access servers 410, and a voice portal 412. Voice portal 412 may include a voice portal application server(s) 414 and a voice recognition server (s) 416. A network 418 may be used to interconnect the firewalls and servers. Additionally, back end server(s) 420 may be provided between service center 106 and voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any type of network, such as an Ethernet or FDDI network. Additionally, network 418 may also include switches and routers as appropriate without departing from the scope of the invention. Further, additional firewalls may be present in network 418, for example, to place one or more of servers 406, 408, 410, or voice portal 412 behind additional firewalls.

Each server (406, 408, 410, 414, 416, 420) may be any type of server or computer, such as a Unix or DOS based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling party's number, setting up conference calls on-line, etc. Consistent with embodiments of the present invention, methods and systems may leverage digital companion server 406 to perform contact management services.

A communication portal server 408 may provide the hardware and software for managing a customer's account and interfacing with customer account information stored by the provider of customer's voice network 104. Network access servers 410 may provide the hardware and software for sending and receiving information to voice network 104 in processing the applications provided by the service center. For example, network access servers 410 may be used for transmitting and/or receiving information from/to an ISCP 302 or an SSP 308 or 310 of voice network 104.

Voice portal 412 includes software and hardware for receiving and processing instructions from a customer via voice. For example, a customer may dial a specific number for voice portal 412. Then the customer using speech may instruct service center 106 to modify the services to which the customer subscribes. Voice portal 412 may include, for example, voice recognition server(s) 416 and voice portal application server(s) 414. Voice recognition server(s) 416 may receive and interpret dictation, or recognize spoken commands. Application server(s) 414 may take, for example, the output from voice recognition server(s) 416, convert it to a format suitable for service center 106 and forward the information to one or more servers (406, 408, 410) in service center 106.

Figure 5:
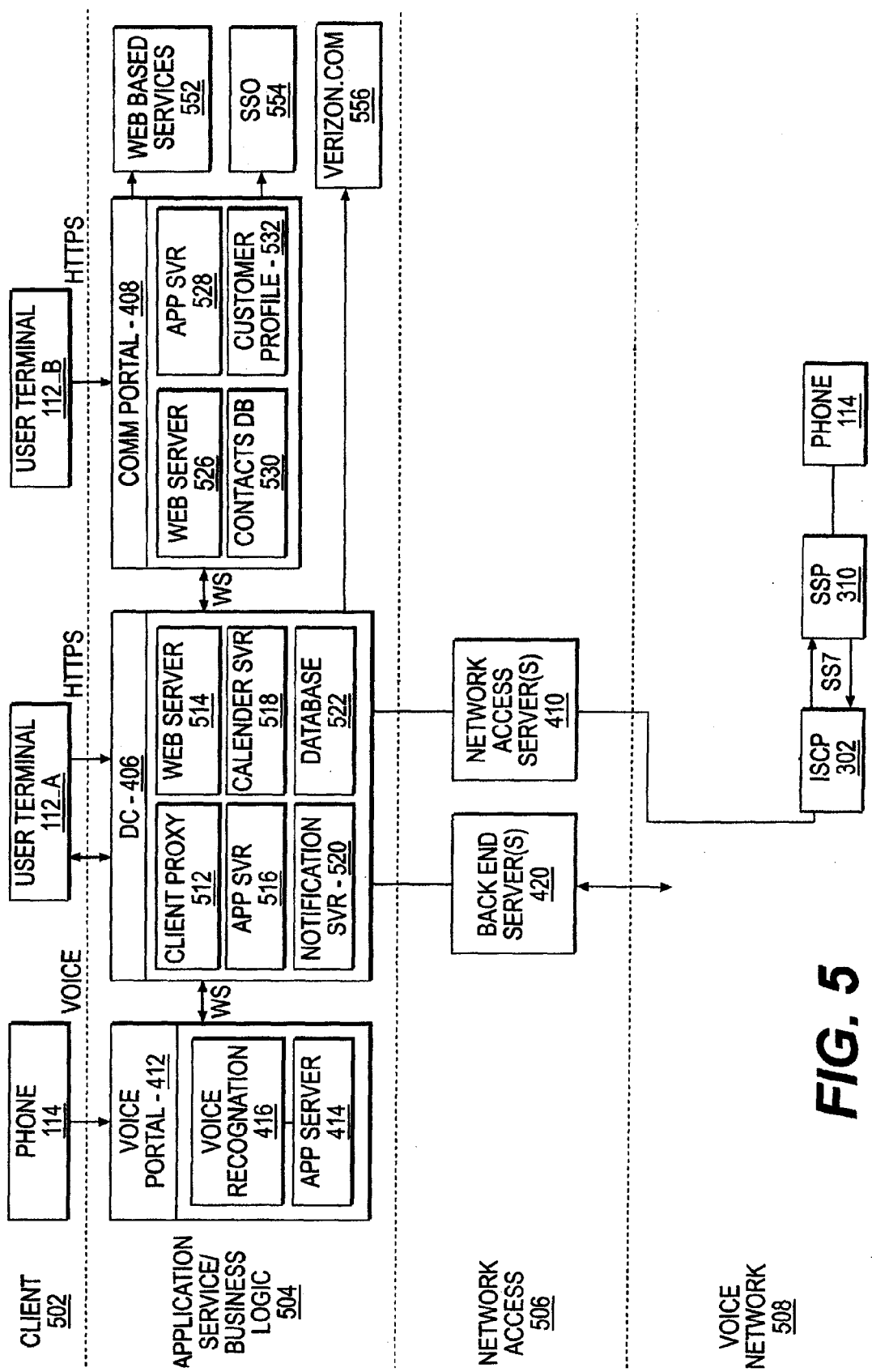
FIG. 5 illustrates a logical architecture of an exemplary system, consistent with the present invention.

FIG. 5 illustrates a logical architecture of an exemplary system, consistent with the present invention. As illustrated, the logical architecture may be split into four planes: client side plane 502, application service plane 504, network access plane 506, and voice network plane 508.

Client side plane 502 includes the user terminals 112_A and 112_B that a user may use to send and/or receive information to/from the service center 106. Additionally, client side 502 includes the user's phone(s) 114. As discussed above, user terminals 112 may be any type of device a user may use for communicating with Service Center 106. For example, user terminal 112_A may be a PDA running a program for communicating with Service Center 106, while user terminal 112_B may be a desktop type computer running a web browser for communicating with Service Center 106 via the Internet. Additionally, the user may have one or more phones 114, such as, for example, one or more standard landline telephones and/or wireless phones.

Application service plane 504 includes digital companion server(s) 406, communication portal server(s) 408, and voice portal 412. These entities may communicate between one another using, for example, web services or any other suitable protocols. Web services are a standardized way of integrating Web-based applications using the Extensible Markup Language (XML), Simple Object Access Protocol (SOAP), Web Services Description Language (WSDL) and Universal Description, Discovery and Integration (UDDI) open standards over an Internet Protocol (IP) backbone.

As illustrated, a digital companion server 406 may provide the following functions: a client proxy 512, a web server 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. This client proxy function 512 may be included in a separate server such that all communications sent from the other digital companion functions/servers to a user terminal 112 via data network 102 go through client proxy 512. Also, if client proxy 512 is included on a separate server, for example, an additional firewall may be provided between client proxy 512 and the other digital companion servers to provide additional security.

Web server 514 provides functionality for receiving traffic over data network 102 from a customer. For example, web server 514 may be a standard web server that a customer may access using a web browser program, such as Internet Explorer or Netscape Communicator.

Application server function 516 encompasses the general functions performed by digital companion server(s) 406. For example, these functions may include interfacing with the various other digital companion functions to perform specific applications provided by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, etc. Consistent with embodiments of the present invention, application server function 516 may facilitate one or more contact management functions.

Additionally, application server function 516 may interface with one or more external devices, such as an external web server, for retrieving or sending information. For example, application server function 516 may interface with a voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application-functions to perform a function at a particular time, etc.

Notification server function 520 provides the capability to send information from service center 106 to a user terminal 112. For example, notification server function 520 at the direction of application server function 516 may send a notification to user terminal 112 that the user is presently receiving a phone call at user's phone 114.

Database function 522 provides the storage of information useable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any type of storage device, such as for example, CD-ROMs, DVD's, disk drives, magnetic tape, etc.

As discussed above, communication portal server(s) 408 provide the hardware and software for managing a customer's account and interfacing with customer account information stored by the provider of customer's voice network 104. As illustrated in FIG. 5, a communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 522 of the digital companion servers, provides functionality for receiving traffic over data network 102 from a customer. For example, the web server may be a standard web server that a customer may access using a web browser, such as Internet Explorer or Netscape Communicator.

Application server function 528 encompasses the general functions performed by communication portal servers 408. For example, these functions may include interfacing with the voice network to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services, such as the "superpages.com" webpage. Application function 528 could then contact these external services 552 to retrieve information, such as an address for a person in the user's address book.

In another example, application server function 528 of communication portal 408 may interface a single sign on (SSO) server 554. SSO 554 may be used to allow users to access all services to which the user subscribes, on the basis of a single authentication that is performed when they initially access the network.

Contacts database 530 may include storage devices for storing an address book for the user. This address book may be any type of address book. For example, the user's address book may include the names, phone numbers, and addresses of people and/or organizations. These storage devices may be internal or external to communication portal servers 408 or some combination in between. In addition, these storage devices may be any type of storage device, such as magnetic storage, memory storage, etc.

Customer profile database 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Additionally, application services plane 504 of the architecture may include a voice portal 412. As discussed above, voice portal 412 may include, for example, a voice recognition server(s) 416 and an application server(s) 414, and be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. Application server(s) 414 of voice portal 412 may include hardware and/or software for exchanging information between digital companion servers 406 and voice recognition server(s) 416 or between communication portal servers 408 and voice recognition server(s) 416. Additionally, application server(s) 414 may be included on a separate server, included in the hardware and software providing voice recognition server(s) 416, included in digital companion servers 406, etc.

Network access plane 506 of the architecture includes the functions for providing connectivity between application service plane 502 and voice network 104. For example, this plane may include network access servers 410 and/or back end servers 420.

Network access servers 410 may be included in the service center 106 and may provide the hardware and software for sending and receiving information to voice network 104 in processing the applications provided by the service center. For example, network access servers 410 may include a Caller ID (CID) functionality for retrieving caller ID information from voice network 104, a click to dial (CTD) functionality for instructing an intelligent peripheral (IP) in the voice network to place a call via an SSP, and/or a real time call management (RTCM) functionality for interfacing with an ISCP of the voice network.

Network Access plane 506 may also include one or more back end server(s) 420. These back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. For example, this voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, back end server(s) 420 may also include, for example, a directory assistance server. This directory assistance server may, for example, interface service center 106 with a Reverse Directory Assistance Gateway (RDA Gateway) of voice network 104. A RDA Gateway is a device for issuing requests to a Data Operations Center (DOC) of voice network 104 for name and/or address information associated with a phone number and receiving the name and/or phone number in response to this request.

In another example, back end server(s) 420 may include a wireless internet gateway that is used for interfacing with a mobile switching center (MSC) of a wireless voice network. As with the above-described back end server(s) 420, this wireless internet gateway may be used for converting requests and information between the formats used by service center 106 and those used by the wireless voice network.

In yet another example, back end server(s) 420 may include a conference blasting server for instructing a conference bridge in voice network 104 to dial out via an SSP to the participants of a voice conference. Or, for example, the back end server(s) may include a server for instructing an IP of the voice network to place a call between two parties by dialing out to each of the parties. Back end server(s) 420 may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward thru the conference.

In yet another example, back end server(s) 420 may include a Single Number Short Message Service (SN SMS) server for interfacing the service center 106 with a SMS gateway in voice network 104. This may be used, for example, to permit the customer to have SMS messages addressed to their home phone number directed to an SMS capable device of the users choosing.

Voice network plane 508 includes the hardware and software included in voice network 104, as discussed above with reference to FIG. 3. For example, voice network plane 508 may include ISCP 302, intelligent peripherals 320, and SSP 308. Additionally, voice network plane 508 may also include the hardware and software included in a wireless carrier's network, such as, for example, the mobile switching center, etc.

For clarity of explanation, system 100 is described herein with reference to the discrete functional elements illustrated in FIGS. 1-5. However, it should be understood that the functionality of these elements and modules may overlap and/or may exist in a fewer or greater number of elements and modules. Elements of system 100 may, depending on the implementation, lack certain illustrated components and/or contain, or be coupled to, additional or varying components not shown. Moreover, all or part of the functionality of the elements illustrated in FIGS. 1-5 may co-exist or be distributed among several geographically dispersed locations.

Consistent with embodiments of the present invention, methods and systems may perform contact management services. As used herein, the term "contact" refers to any individual and/or entity with which a user (e.g., user 110) is associated, has communicated, and/or desires to communicate. Non-limiting examples of "contacts" include acquaintances, friends, relatives, business, business associates, potential business associates, spouses, children, etc. In certain embodiments, contacts may include individuals and/or entities which initiate contact with a user (e.g., 110) via one or more communication devices (e.g., via telephones 114, 116, etc.), and the contacts may include individuals/entities previously unknown to the user prior to such contact. Contacts may also include individuals and/or entities with which the user initiates contact.

Consistent with principles of the present invention, contacts may be added to the address book in response to communications received by and/or initiated from several devices associated with a particular user. For example, calling and/or called parties associated with user's 110 cell phone, landline phone, facsimile, laptop, and/or PDA may be added to the address book.

Figure 6:
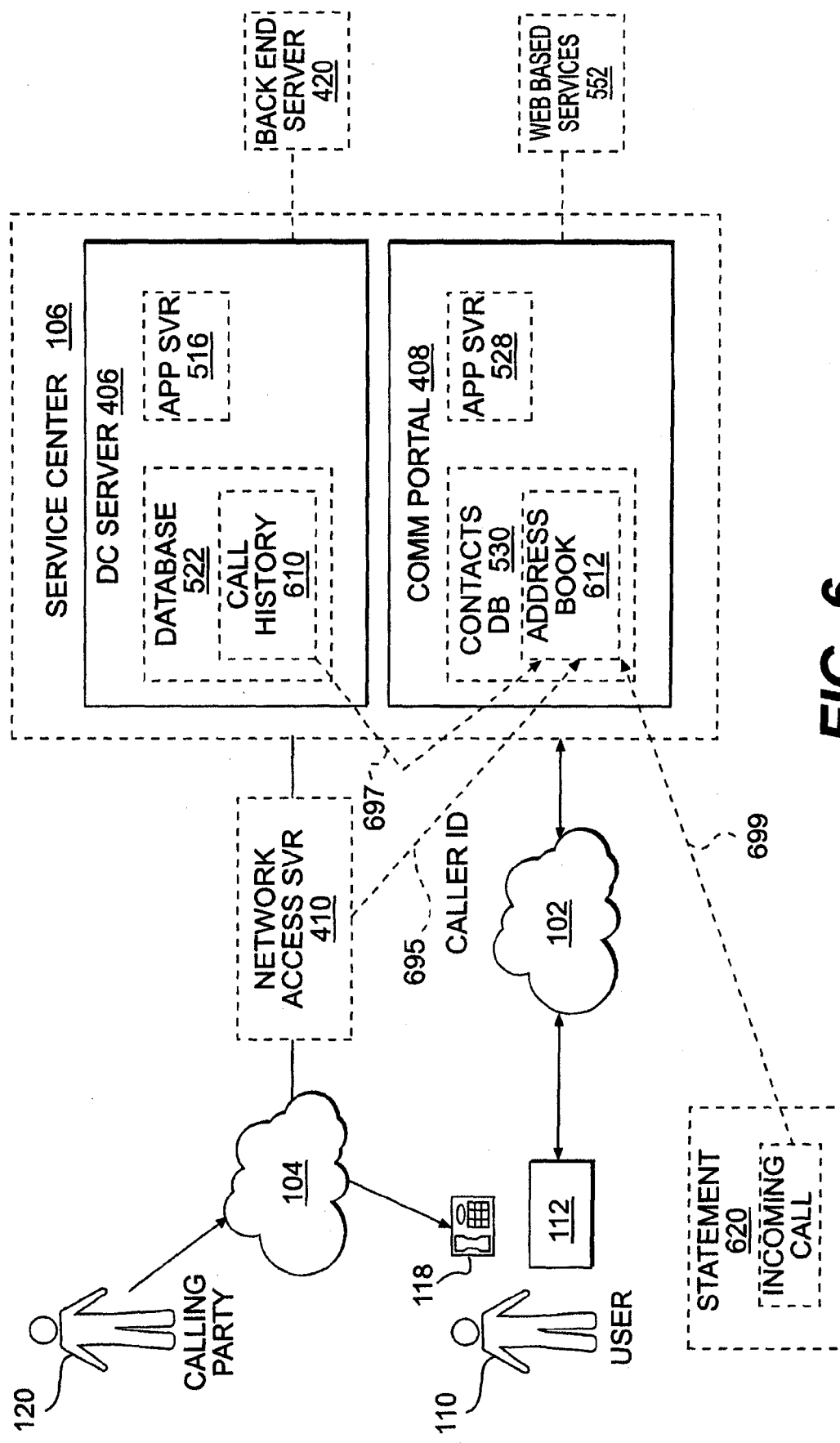
FIG. 6 is a diagram illustrating features and aspects consistent with certain embodiments of the present invention.

FIG. 6 diagrammatically illustrates an overview of contact management processes and features consistent with certain embodiments of the present invention. As illustrated, an address book 612 may be provided and maintained. Address book 612 may represent any system, device, and/or facility capable of maintaining, managing, and/or providing access to contact-related information associated with contacts. Thus, the term "address" encompasses contact-related information. Address book 612 may be implemented by one or more software, hardware, and/or firmware elements. In certain embodiments, address book 612 may include a network-based service and/or database. Address book 612 may be implemented in a server coupled to a network. In one example, address book 612 may include a server-side Web service, which may be implemented using (and leverage) XML-over-HTTP and Microsoft .NET. In certain embodiments, address book 612 may be created and edited via application 528 in communications portal server 408 and, as illustrated in FIG. 6, located/maintained in contacts database 530. Address book 612 may be configured to store, manage, and provide access to information associated with contacts. User 110 may access address book 612 through user terminal 112 via a Graphical User Interface (GUI), in certain embodiments of the present invention. Consistent with principles of the present invention, application 516 in digital companion server 406 may enable user 110 to add contacts to address book 612.

Consistent with embodiments of the present invention, contacts may be added to address book 612 from one or more contact sources. For example, as depicted in FIG. 6, contacts may be added from a CID display (flow line 695), a call history (flow line 697), and/or a billing/account statement (flow line 699).

As illustrated in FIG. 6, user 110 may receive a telephone call from calling party 120 via, for example, telephone 118. In certain embodiments, network access server 410 and voice network 104 may be leveraged to obtain CID information associated with calling party 120. Such CID information may be displayed to the user (e.g., via telephone 118 and/or user terminal 112) and may be inserted in address book 612 (flow line 695). The CID information may inserted automatically and/or in response to a user command. For example, user 110 may view the CID display and select one or more displayed listings for addition to address book 612.

In certain embodiments, contacts may be added to address book 612 from call history 610. Call history 610 may be implemented via one or more data files and/or structures residing on (or distributed among) one or more storage devices. For example, as illustrated in FIG. 6, call history 610 may be stored via database function 522. Call history may include a listing of calls originating from or received by one or more devices associated with user 110 (e.g., cell phone, landline phone, facsimile, PDA, etc.). In certain embodiments, call history 610 may represent one or more "call logs." Methods and systems of the present invention may retrieve contact-related information associated with a listing in call history 610 and insert the retrieved contact information to address book 612. In certain implementations, call history 610 could include contact-related information associated with each listed call, and in such implementations, the contact-related information may be transferred from call history 610 to address book 612.

In addition, contacts may be added from billing/account statements, e.g., statement 620. Statement 620 represents a physical and/or electronic statement associated with user 110's account. In one embodiment, statement 620 may be generated and provided to user 110 via communication portal server 408 and user terminal 112. Consistent with embodiments of the present invention, call management methods and systems may add contacts to address book 612 from statement 620. For example, upon viewing statement 620 on user terminal 112, user 110 may input a command to server 406 (via user terminal 112) that causes contact information associated with a party listed on statement 620 to be obtained and inserted in address book 612.

Call management processes consistent with the present invention may leverage one or more systems included in or coupled to service center 106 to obtain contact-related information for parties. In certain embodiments, call management methods and systems may leverage one or more back end server(s) 420 to obtain contact information. As illustrated in FIG. 6, digital companion server 406 may be configured to interact with back end server 420. Back end server 420 may include hardware and/or software for interfacing service center 106 with voice network 104. Back end server 420 may be connected to service center 106 via a network (e.g., a corporate network), a direct connection, or in any other suitable manner. Further, back end server 420 may connect to one or more devices in voice network 104 by a network, a direct connection, or in any other suitable manner. Consistent with embodiments of the present invention, back end server 420 may include or be configured to operate as one or more RDA application servers. As such, back end server 420 may interface service center 106 with an RDA Gateway in voice network 104 and a Data Operations Center (DOC). Back end server 420 may facilitate RDA lookup processes, which may obtain contact-related information (e.g., name, address, etc.) associated with a party by way of a telephone number or other identifier associated with that party.

In certain embodiments, call management methods and systems may leverage one or more networks and/or Web-based services to obtain contact-related information. In such embodiments, communication portal server 408 may be configured to interact with Web-based services 552, which may provide web services, such as the "superpages.com" website. Application function 528 in server 408 may contact external services 552 to retrieve information, such as an address for a person listed in address book 612. This functionality may be especially useful if address book 612 includes only a name for a particular contact.

Although FIG. 6 illustrates a call originating from a calling party, contacts may be added to address book 612 when user 110 places an outgoing call to a called party. That is, in addition to adding contacts to address book 612 from received calls, contacts may be added from outgoing calls originating from user 110. In one embodiment, contacts associated with outgoing calls may be added to address book 612 via call history 610. In addition, or as an alternative, contacts associated with outgoing calls may be added to contact list when they are placed by user 110. For example, when user 110 places a call via telephone 118, user 110 may input a command to terminal 112 (or be prompted to respond to a notification by terminal 112), which causes the called party to be added to address book 612.

Further, although FIG. 6 illustrates a single user 110, a single calling party 120, and a single address book 612, it should be understood that any number of users, calling parties may be serviced by one or more service centers 106. In addition, a plurality of address books 612 may be provided for each of a plurality of users 110. Further, in one embodiment, a single address book facility may be configured to service a plurality of users 110.

Moreover, in addition to incoming and outing telephone calls, contacts may be added to address book 612 in response to other communications associated with user 110. For example, contacts may be added to address book 612 in response to incoming and/or outgoing facsimiles, e-mails, instant messages, voice mail messages, etc. associated with user 110.

In addition, contacts may be added to address book 612 automatically and/or on demand. That is, contact information associated with a called or calling party may be automatically added to address book 612 in response to an outbound or inbound call or may be added to address book 612 in response to a command from user 110. For example, server 406 may, in conjunction with server 408, automatically retrieve and add contact information associated with a called party or calling party to address book 612.

Consistent with embodiments of the present invention, methods and systems may dynamically and/or periodically update information included in address book 612. One or more components in, or coupled to, service center 106 (e.g., server 406 and/or 420) may monitor, and/or retrieve information from, various resources, such as communication devices, networks, etc. in order to update address book 612. In addition, or as an alternative, a particular address book 612 may interact with other address books 612 and may update to reflect information included in the other address books. Consistent with embodiments of the present invention, one or more agent networks or systems may be associated with address book 612, which may periodically or on demand cause address book 612 to update.

In one embodiment, address book 612 may self-update periodically (e.g., every 7 days) in order to refresh stored contact-related information. In addition, or as an alternative, contact-related information included in address book 612 may be refreshed dynamically, e.g., in response to changes in contact-related information associated with one or more contacts included in address book 612. Changes in contact-related information may be caused by the contact and/or by another party, and one or more components in, or coupled to, service center 106 may be configured to detect such changes. In certain embodiments, address book 612 may be automatically updated (e.g., by one or more components in service center 106) to reflect changes in contact-related information for a contact included in address book 612.

In certain embodiments, a plurality of address book 612 may be associated with a plurality of users 110, and each address book 612 may interact with other address books 612. Each address book 612 may be tailored to its respective user, and each user may control the information available to other address books 612. In alternative embodiments, a single address book 612 may service a plurality of users 110. In this fashion, each user 110 may be provided with a specific view of a larger body of available information included in address book 612. Each address book view may be tailored to its respective user 110, and each user 110 may specify specific information to make available to other address book views. In certain embodiments, each address book 612 or address book view may self-update to reflect changes in contact-related information in response to its respective user 110 logging in or accessing the address book or view.

In certain implementations of the present invention, user 110 may specify and alter the manner in which contacts are added to address book 612 via, for example, user terminal 112, which may interface with elements in server 406 and/or communication portal server 408. For example, user 110 may designate certain sources (e.g., history 610, statement 620, etc.) from which to obtain contacts. User 110 could also specify the manner in which contact information is obtained for contacts. In addition, user 110 could set parameters that cause contacts to be automatically added to address book 612 from one or more sources. In one embodiment, user 110 may set and change preferences/parameters via application function 516 and/or application function 528. In addition, user 110 may dynamically change the manner in which contacts are added to the contact list at any time.

Figure 7:
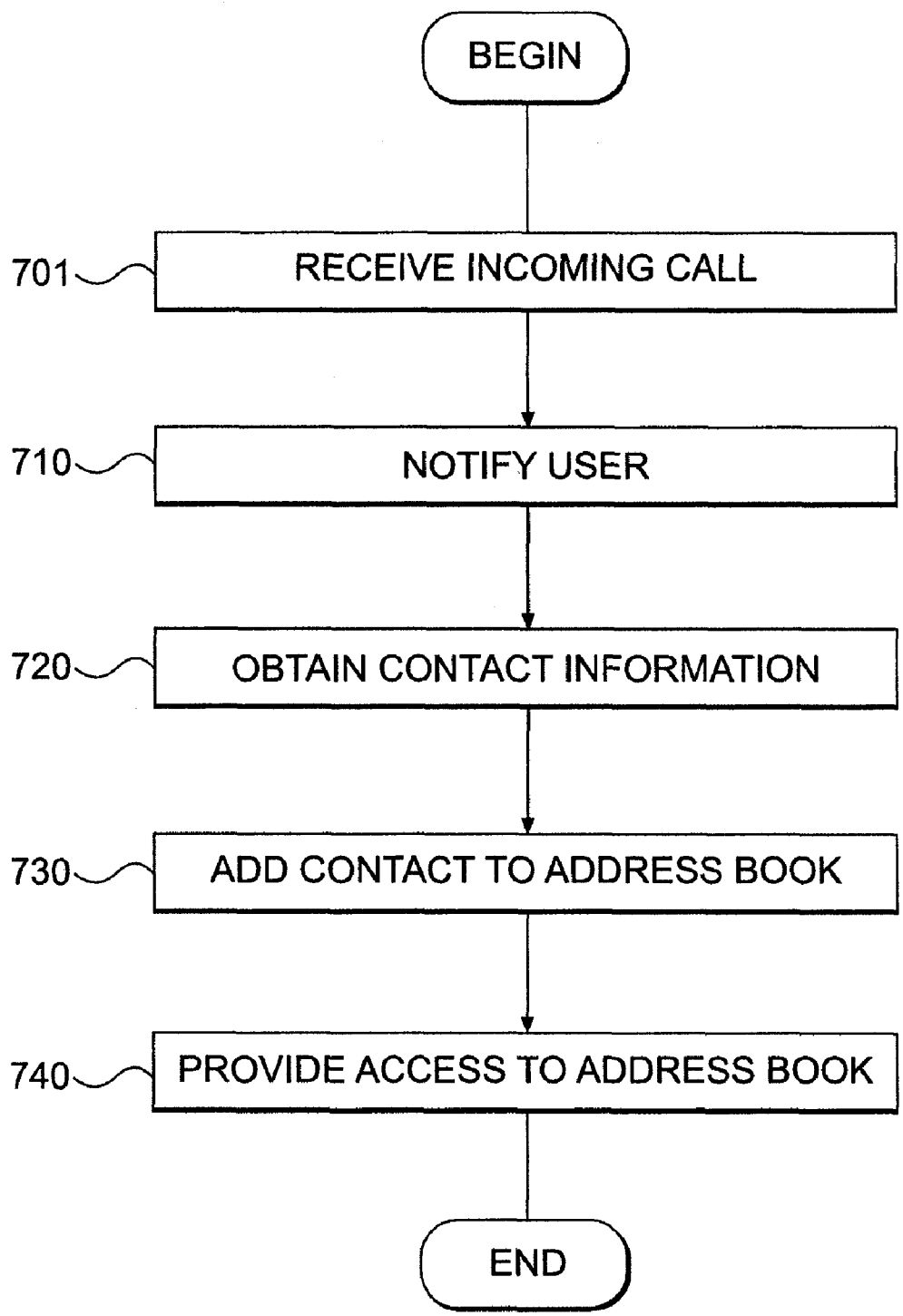
FIG. 7 is a flowchart depicting stages of an exemplary method consistent with certain embodiments of the present invention.

FIG. 7 is a flowchart depicting stages in an exemplary contact management process consistent with embodiments of the present invention. The illustrated process may begin when an incoming call is received (stage 701). For example, a call originating from calling party 120 and serviced by network 104 may be received via telephone 118 (FIG. 6). Consistent with embodiments of the present invention, methods and systems may notify user 110 of the incoming call (stage 710). In certain embodiments, methods and systems of the present invention may notify user 110 of the incoming call via user terminal 112. In such embodiments, notification server function 520 may send a notification to user terminal 112 that user 110 is presently receiving a call at telephone 118. Methods and systems of the present invention could, in alternative embodiments, notify user 110 of the incoming call via a CID display.

After an incoming call is received and the user is notified, contact information associated with the calling party (e.g., 120) may be obtained (stage 720). In the process of FIG. 7, obtaining contact information may include obtaining CID information. As explained above, network access servers 410 may include CID functionality for retrieving caller ID information from voice network 104. In certain embodiments, obtaining contact information may include obtaining contact information for calling party 120 using CID information. That is, CID information may be leveraged to obtain additional contact information for a contact. For example, digital companion server 406 and/or back end server 420 may use CID information (e.g., a telephone number) to retrieve contact information associated with calling party 120 (e.g., via RDA processes).

In one embodiment, contact information associated with the calling party may be obtained automatically when the incoming call is received. Alternatively, contact information for the calling party may be obtained in response to a user command. As mentioned above, notification server function 520 may send a notification to user terminal 112 that user 110 is presently receiving a phone call at telephone 118. In response to this notification, user 110 may input a command to user terminal 112 that causes the CID information associated with calling party 120 to be captured for insertion into address book 612.

In one embodiment, user 110 may be prompted by user terminal 112 (e.g., via server 406) to indicate whether a particular calling party should be added to an address book, and contact information may be obtained in response to an affirmative indication by user 110. User 110 may, in one example, be prompted each time an incoming call is received. In certain embodiments, user 110 could input one or more commands to user terminal 112 in order to preset address book preferences. For example, user 110 could input commands to user terminal 112 that cause calling parties associated with incoming calls to be added to address book 612 automatically. User 110 could also set filtering options that cause certain incoming calls to be added to address book 612 and others to be excluded. Such filtering could be based on telephone numbers, locations, devices, names, etc.

After contact information for the calling party (e.g., 120) is obtained, the contact (i.e., the calling party) may be added to address book 612 (stage 730). In the process of FIG. 7, adding contact information to the address book may include inserting the CID information in address book 612. Consistent with embodiments of the present invention, methods and systems may insert the CID information retrieved by network access servers 410 into address book 612, which may be located in contacts database 530 of communications portal server 408. In one example, the CID information may be inserted in address book 612 via application function 528 and/or application function 516. In certain embodiments, adding a contact to address book 612 may involve determining whether the contact (i.e., the calling party) already exists in address book 612. Methods and systems of the present invention may determine whether a particular contact represents a new contact or one that was previously entered in address book 612. Application function 516 and/or application function 528 may perform such a determination. If the contact is found in address book 612 (i.e., the contact is not a new contact), the contact may not be added. In certain embodiments, however, user 110 may be prompted (e.g., via user terminal 112) to indicate whether contact information corresponding to the selected contact found in address book 612 should be overwritten with the obtained contact information. If the contact represents a new contact, a new contact entry may be created and the obtained contact information associated with the contact may be added to address book 612, thereby adding the new contact to the address book. In certain embodiments, user 110 could be notified via user terminal 112 of additions to the address book.

In addition, the contact (i.e., calling party 120) may be added to address book 612, even if the contact is not new, if the obtained contact information is different from the information found in address book 612. In such a case, user 110 may be prompted (e.g., via user terminal 112) to indicate whether the contact information in address book 612 should be overwritten with the obtained contact information.

Consistent with certain embodiments of the present invention, contacts may be added to address book 612 in response to user instructions. For example, after the contact information is obtained (stage 720), the obtained information may be presented to user 110. User 110 may then be prompted to indicated whether the presented information should be inserted in address book 612. In some instances, the obtained contact information may include multiple listings (e.g., multiple addresses) for a contact. In such instances, the listings may be presented to user 110, and user 110 may select one or more of the listings to add to address book 612.

After adding the contact to address book 612, methods and systems of the present invention may provide user 112 with access to the added information in address book 612 (stage 740). In certain embodiments, user 110 may access address book 612 via user terminal 112 and digital companion server 406 (e.g., application function 516). Providing access to address book 612 may, for example, include visually, audibly, and/or physically presenting information associated with address book 612 to user 110.

Figure 8:
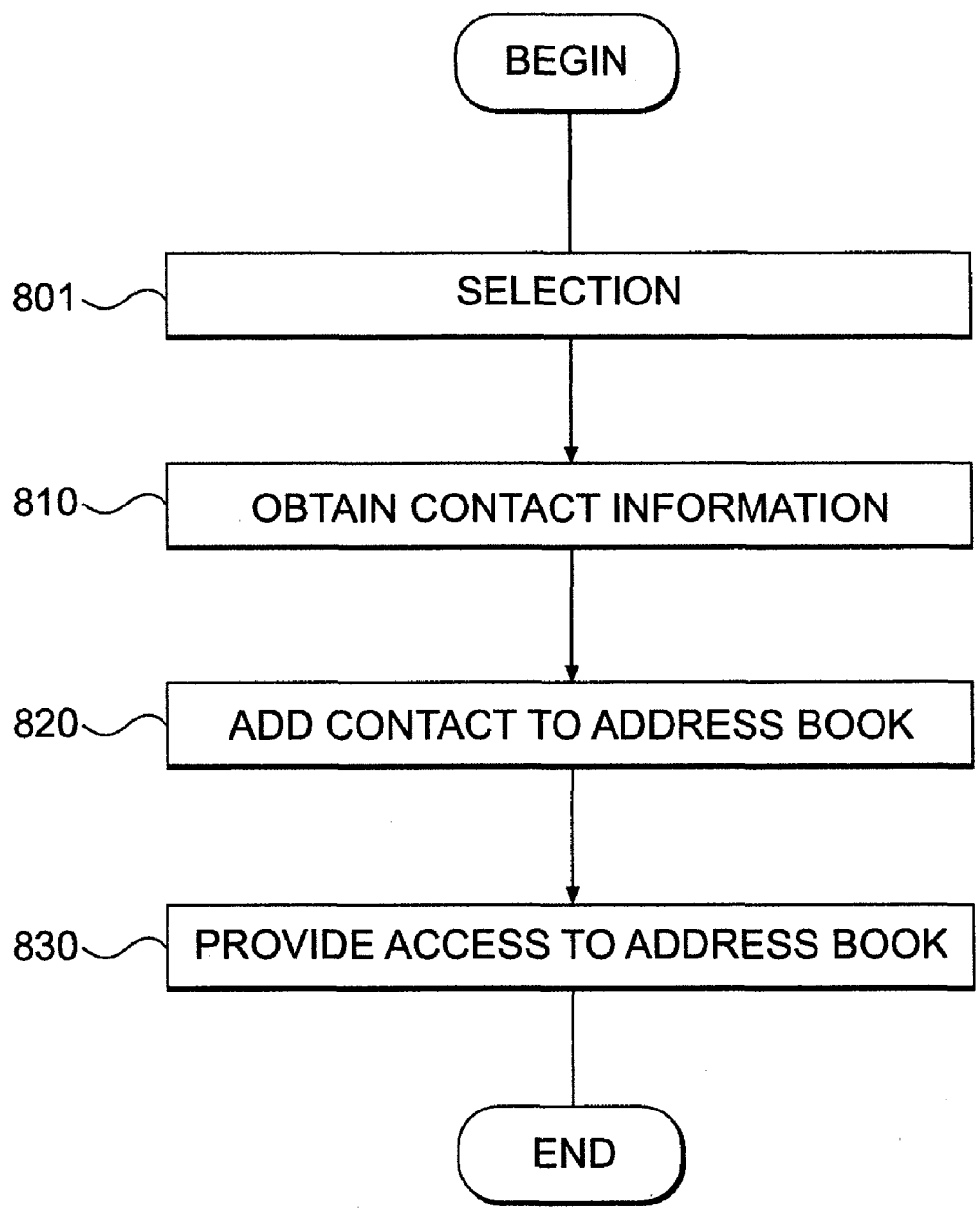
FIG. 8 is a flowchart depicting stages of an exemplary method consistent with certain embodiments of the present invention.

FIG. 8 is a flowchart depicting stages in another exemplary contact management process consistent with embodiments of the present invention. The illustrated process may begin when a contact is selected (stage 801) to be added to address book 612 (FIG. 6). In one embodiment of the present invention, a contact may be selected by way of user 110 inputting information (e.g., a telephone number) directly to user terminal 112 and requesting that the party associated with the number be added as a contact. In addition, or as an alternative, user 110 may select a contact from a contact source, e.g., call history 610, statement 120, etc. User 110 may, in one embodiment, make such a selection via user terminal 112. For example, user 110 may view statement 620 (provided by communication portal server 408) via user terminal 112 and select a particular listing from statement 620 by inputting one or more commands to user terminal 112. As an example, user 110 may select an incoming call from calling party 120 listed in statement 620. In such a case, calling party 120 represents a contact that user 612 desires to add to address book 612. In another example, user 110 may view (e.g., via user terminal 112) call history 610 located in database 522 of server 406. User 110 may then select a particular listing from call history 610, e.g., a particular outbound call listed in call history 610. Listings or entries selected by user 110 from either call history 610 or statement 620 may, in one configuration, be in the form of a telephone number. Consistent with embodiments of the present invention, the selection may be transmitted from user terminal 112 to one or more elements in service center 106, such as application function 516 in server 406.

Consistent with principles of the present invention, contact information may be obtained based on, and in response to, the selection (stage 810). In certain embodiments, one or more elements in service center 106 may obtain contact information in response to the selection. In one such embodiment, the listing selected by the user (stage 801) may include a telephone number, and server 406 in conjunction with back end server 420 may perform RDA processes to obtain contact information associated with that number. Referring to the above example in which calling party 120 represents the contact, contact information for calling party 120 may be obtained using a telephone number associated with calling party 120. In addition, or as an alternative, server 408 may leverage web based services 552 to obtain contact information associated with a particular number selected by user 110. Further, in certain configurations, server 406 may leverage network access server 410 to obtain contact information associated with the user selection.

In one configuration, call history 610 may include contact information (e.g., name, address, etc.) for each entry. For example, call history 610 may list incoming and/or outgoing calls and contact information corresponding to the parties associated with those calls. In such a case, one or more elements in service center 106 (e.g., application function 516) may obtain contact information (stage 810) by retrieving the contact information from call history 610.

Upon obtaining contact information for the selected contact (e.g., calling party 120), the contact may be added to address book 612 (stage 820). Consistent with embodiments of the present invention, the obtained contact information may be inserted in address book 612 via application function 528 and/or application function 516. Processes represented by stage 820 may be consistent with one or more processes represented by stage 730 of FIG. 7.

After the selected contact is added to address book 612, access to the added contact may be provided to user 110 (stage 830). Stage 830 may represent processes that are consistent with one or more processes represented by stage 740 of FIG. 7.

Figure 9:
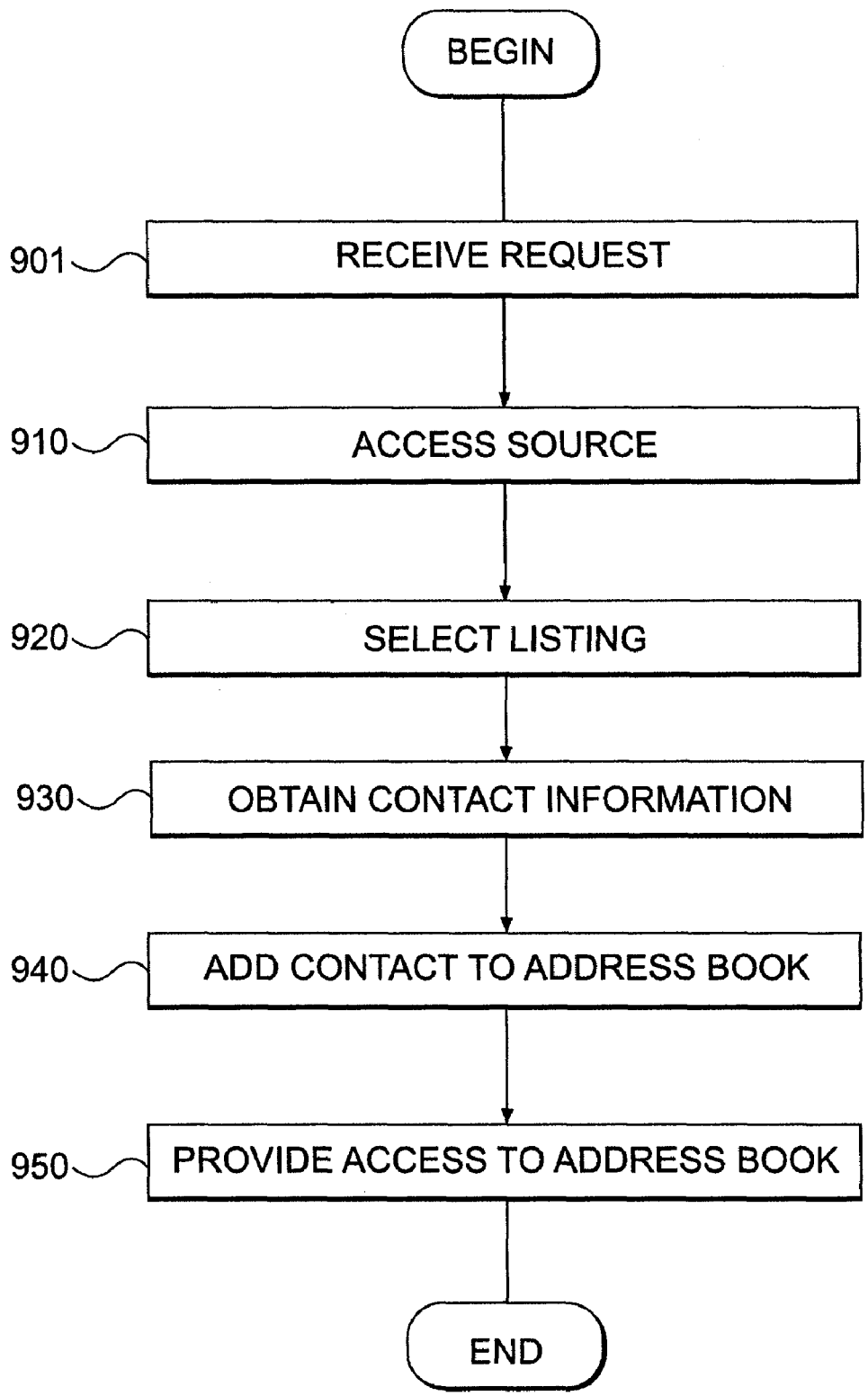
FIG. 9 is a flowchart depicting stages of an exemplary method consistent with certain embodiments of the present invention.

FIG. 9 is a flowchart depicting stages in another exemplary contact management process consistent with embodiments of the present invention. The illustrated process may begin when a request is received (stage 901) to add one or more contacts to address book 612 (FIG. 6). Consistent with embodiments of the present invention, user 110 may initiate such a request by inputting one or more commands to user terminal 112. User terminal 112 may then forward the request to one or more elements within service center 106 (e.g., server 406) for processing. In one example, user 110 may request that a particular call, or group of calls, be added to address book 612. User 110, may for instance, input commands to user terminal 112 that request that all incoming calls received on a particular day and via a particular device (e.g., telephone 118) be added. User 110 could also request that future incoming/outgoing calls received and/or placed via one or more devices be added to address book 612. In alternative embodiments, user 110 could input a telephone number directly to user terminal 110 and request that the party associated with that number be added to address book 612.

In addition, or as an alternative, a request to add contacts may be initiated by one or more elements included in or coupled to service center 106, with or without user intervention and/or knowledge. For example, user terminal 112 may be configured to automatically send a request to service center 106, in response to calls, e-mails, facsimiles, etc. placed and/or received by user 110, that causes contacts to be added to address book 612. Also, user terminal 112 may be configured to periodically request that certain contacts be added to address book 612. As an example, user terminal 112 could request (e.g., on a monthly basis) that all calling parties associated with incoming calls received by telephone 118 be added to user 110's address book 612.

Upon receiving a request to add contacts to address book 612, one or more contact sources may be accessed (stage 910). In one example, application function 516 and/or application function 528 may access one or more contact sources (e.g., call history 610 and/or statement 620) based on the received request. For instance, call history 610 may be accessed in response to a request to add contacts based on previously placed outgoing calls made by user 110.

Upon accessing the appropriate contact source, the process of FIG. 9 may select a listing/entry from the contact source to add to address book 612 (stage 920). For example, application function 516 may select a particular group of calls from call history 610 based on the received request (stage 901). After the listings are selected, contact information may be obtained. In one embodiment, call history 610 may include contact information for each of its listings, and the contact information may obtained directly from call history 610. In addition, or as an alternative, CID systems, RDA processes, and web based services may be leverage to obtain contact information. Stage 930 may represent processes that are consistent with one or more processes represented by stages 720 and 810 of FIGS. 7 and 8.

After the contact information is obtained, it may be added to address book 612 (stage 940), thereby adding the contact(s) to address book 612. Consistent with embodiments of the present invention, access to the added contact may be provided to user 110 (stage 950). Stages 940 and 950 may represent processes that are consistent with one or more processes represented by stages 730, 740, 820 and 830 of FIGS. 7 and 8.

Figure 10:
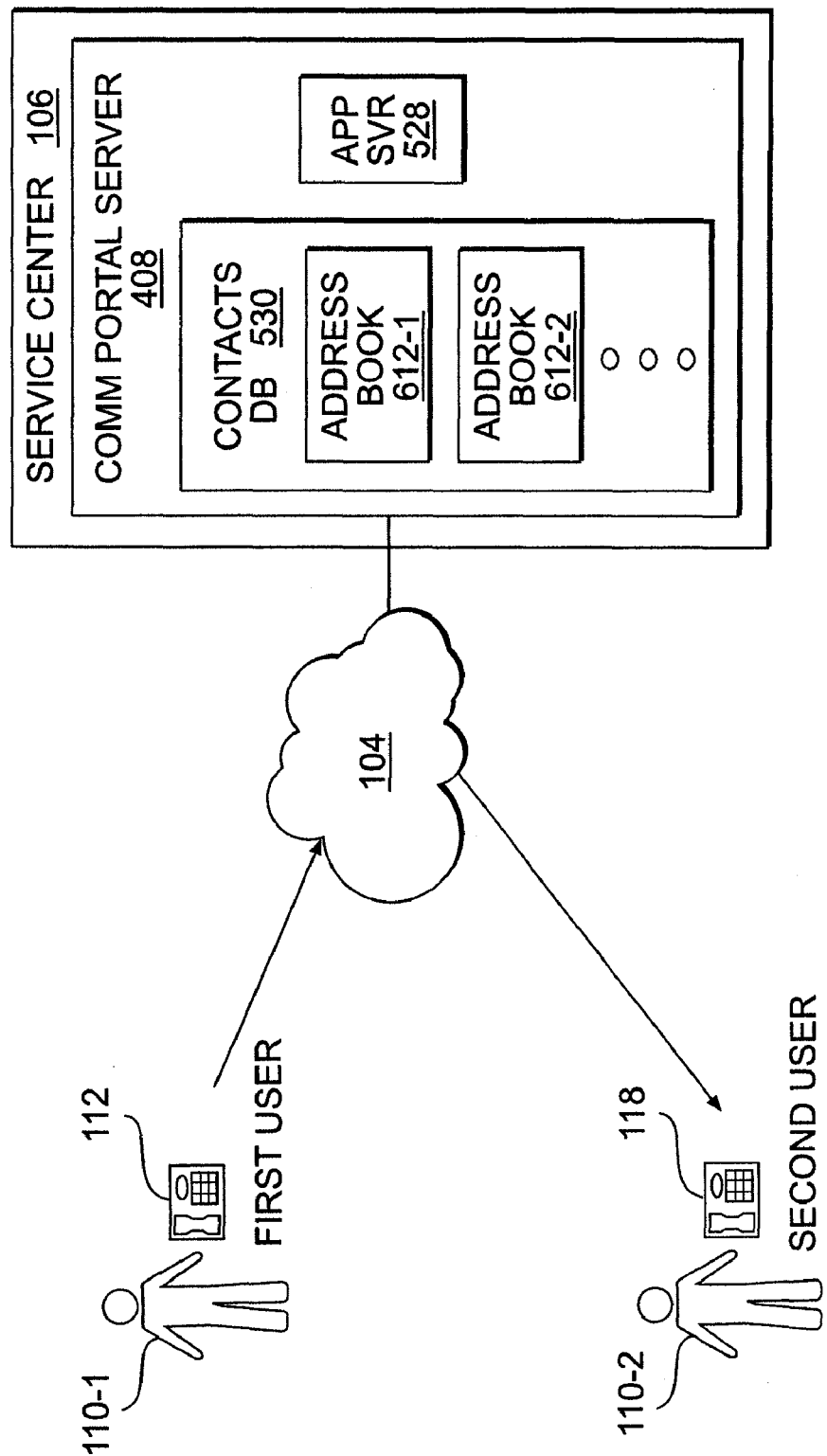
FIG. 10 is a diagram illustrating features and aspects consistent with certain embodiments of the present invention.

FIG. 10 diagrammatically illustrates an overview of contact management processes and features consistent with certain embodiments of the present invention. As illustrated, address books 612 (including address book 612-1 and 612-2) may be provided and maintained on communication portal servers 408. Address books 612 may represent any system, device, and/or facility capable of maintaining, managing, and/or providing access to contact-related information associated with contacts. Thus, the term "address" encompasses contact-related information. Address books 612 may be implemented by one or more software, hardware, and/or firmware elements. In certain embodiments, address books 612 may include a network-based service and/or database. Address books 612 may be implemented in a server coupled to a network. In one example, address books 612 may include a server-side Web service, which may be implemented using (and leverage) XML-over-HTTP and Microsoft .NET. In certain embodiments, address books 612 may be created and edited via application server function 528 in communications portal server 408 and, as illustrated in FIG. 6, located/maintained in contacts database 530. Address books 612 may be configured to store, manage, maintain, and provide access to information associated with contacts. Address book 612-1 may be associated with a first user 110-1 and may be accessed through user terminal 112 via a Graphical User Interface (GUI) or through telephone 114 via voice portal 412. Similarly, address book 612-2 may be associated with a second user 110-2 and may be accessed through similar means.

Consistent with embodiments of the present invention, contact information associated with one or more contacts may be shared among various users. For example, as illustrated in FIG. 10, first user 110-1 may receive a telephone call from second user 110-2. During the call, second user 110-2 may ask first user 110-1 or first user 110-1 may offer to share contact information possessed by first user 110-1 in address book 612-1. After or during the call, first user 110-1 may send a share contacts request to service center 106 to copy contact information from address book 612-1 to address book 612-2. The request may be made at user terminal 112 via a Graphical User Interface (GUI) and serviced by data network 102. Alternatively, the share contacts request may be made at telephone 114 via voice portal 412 and serviced by voice network 104. For example, first user 110-1 may utter a command, such as, "Share working group contacts with John," John being an exemplary name of second user 110-2. Application server function 516 and/or application server function 528 may process and forward the share contacts request, whether it be a data or voice request, to second user 110-2. Second user 110-2 may choose be given an opportunity to confirm the share contacts request before the contact information is copied from address book 612-1 to address book 612-2. In addition, first user 110-1 may request contact information from second user 110-2 and a similar process may be undertaken to copy contact information from address book 612-2 to address book 612-1.

Consistent with embodiments of the present invention, methods and systems may dynamically and/or periodically update information included in address books 612. In addition, or as an alternative, a particular address book 612-1 may interact with other address books 612 and may be updated to reflect contact information included in the other address books. For example, after contact information has been copied from address book 612-1 to address book 612-2, application server function 516 and/or application server function 528 may detect changes in address book 612-1 and may update corresponding contact information that has been copied to address book 612-2. Changes to contact information in address book 612-1 may occur, for example, as a result of user input or as a result of one or more agent networks or systems associated with address book 612-1. The one or more agent networks or systems may periodically or on demand update contact information in address book 612-1. As mentioned above, application server function 516 and/or application server function 528 may request confirmation from second user 110-2 before updating contact information in address book 612-2. For example, second user 110-2 may receive a notification of a change in contact information recorded in address book 612-1 and may be prompted to indicate whether or not second address book 612-2 should be updated to reflect the change.

Address book 612-1 may, in one configuration, update in response to a call received at one or more communication devices from a caller. If the caller is second user 110-2, then contact-related information may be retrieved from, for example, address book 612-2 associated with second user 110-2. For example, second user 110-2 may send a photograph to second address book 612-2 with which second user 110-2 is associated. When second user 110-2 contacts first user 110-1 (e.g., places or receives a telephone call), first address book 612-1 associated with first user 110-1 may automatically update to include the photograph by retrieving a copy of the photograph from second address book 612-2. Alternatively, first user 110-1 may be notified of the change in contact-related information and be prompted to indicate whether or not first address book 612-1 should update to reflect the change. Photographs as well as any other contact information capable of being stored in address books 612 may be updated in a similar manner.

Further, although FIG. 10 illustrates only two users (users 110-1 and 110-2), it should be understood that any number of users, calling parties may be serviced by one or more service centers 106. Thus, users 110-1 and 110-2 may request contact information from other users (not shown). In addition, a plurality of address books 612 may be provided for each of a plurality of users 110-1 and 110-2 or, in one embodiment, a single address book may be configured to service a plurality of users. For example, a local address book may be maintained on user terminal 112 and may periodically receive updates from address book 612-1. Therefore, contact information may be copied between address books on a one to one (as shown in FIG. 10), one to many, many to many, or many to one basis. Furthermore, contact information may be marked as private and a request to copy contact information marked as private may be denied. One or both of users 110-1 and 110-2 may be notified of a failure to copy contact information that is marked as private.

Figure 11:
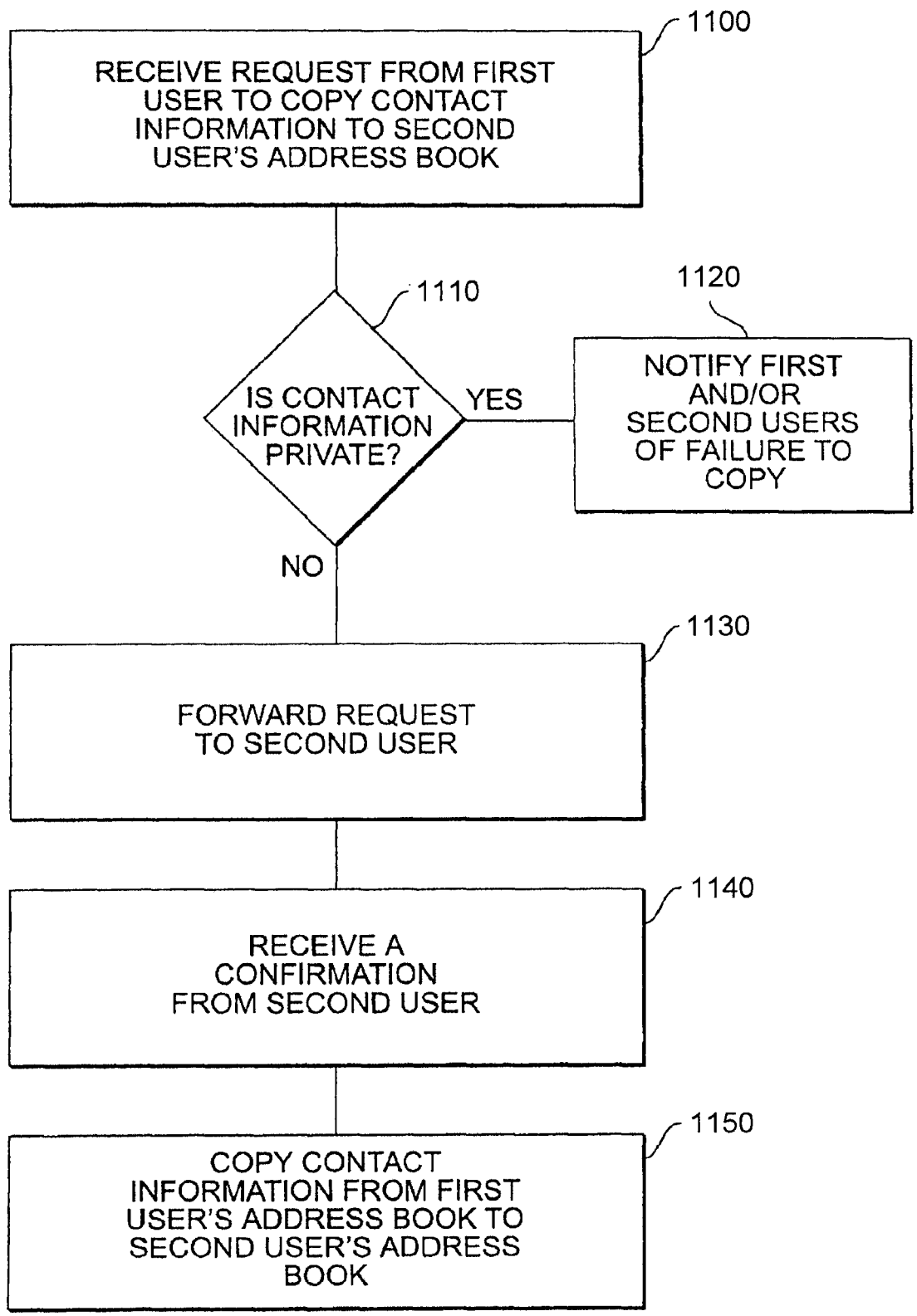
FIG. 11 is a flowchart depicting stages of an exemplary method consistent with certain embodiments of the present invention.

FIG. 11 is a flowchart depicting stages in an exemplary contact sharing process consistent with embodiments of the present invention. The illustrated process may begin when a share contacts request is received from first user 110-1 (stage 1100). The share contacts request originating from first user 110-1 may be received via user terminal 112 or via telephone 114. In certain embodiments, methods and systems of the present invention may determine whether any portion of the contact information is marked as private (stage 1110). Any portions marked private are not copied and first user 110-1 and/or second user 110-2 may be notified of a failure to copy the private contact information (stage 1120). As to portions not marked private (i.e., non-private contact information), the share contacts request may be forwarded to second user 110-2 (stage 1130). For example, second user 110-2 may be prompted to accept or reject the non-private contact information. Moreover, second user 110-2 may be given a predetermined period of time (e.g., thirty days) to confirm the share contacts request before it expires and must be resent by first user 110-1. If second user 110-2 confirms the share contacts request, the confirmation may be received at communication portal servers 408 (stage 1140). Contact information may then be copied from address book 612-1 to address book 612-2 (stage 1150). Application server function 516 and/or application server function 528 may perform the stages shown in FIG. 11.

Figure 12:
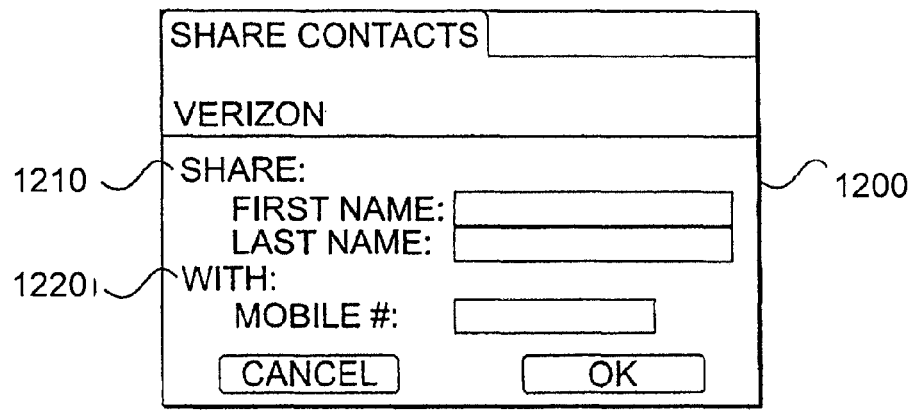
FIG. 12 is an exemplary screen view presented by a user terminal, consistent with the principals of the present invention.

FIG. 12 is an exemplary screen view presented by user terminal 112 to first user 110-1. A share contacts window 1200 may prompt first user 110-1 to select contacts to be shared with second user 110-2. For example, first user 110-1 may enter all or part of the first and/or last name of a contact in share fields 1210 and a telephone number corresponding to a recipient of contact information (e.g., second user 110-2) in with field 1220. Alternatively, share contacts window 1200 may prompt first user 110-1 to browse for one or more contacts or groups of contacts to be shared and for one or more contacts or groups of contacts to be recipients of contact information. Share contacts window 1200 may also prompt first user 110-1 for a selection among contacts matching a partially entered first and/or last name entered in a browse prompt or in share fields 1210. If a contact to be shared or the recipient is not found in address book 612-1, but is found in a locally stored address book, first user 110-1 may be prompted to upload the discovered contact information to address book 612-1 before proceeding.

Figure 13:
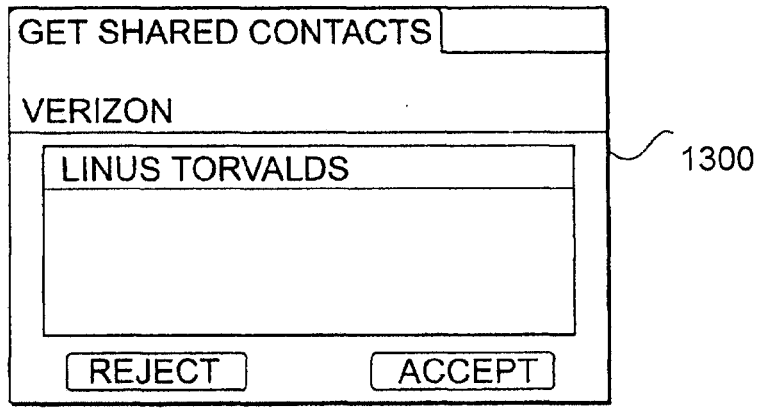
FIG. 13 is an exemplary screen view presented by a user terminal, consistent with the principals of the present invention.

FIG. 13 is an exemplary screen view presented by a user terminal to second user 110-2. A get shared contacts window 1300 may prompt second user 110-2 to accept or reject addition of contact information to an address book belonging to second user 110-2. In an exemplary embodiment, second user 110-2 may receive a short message system (SMS) message providing notification of a received share contact information request. Clicking on the SMS message may open get shared contacts window 1300. Get shared contacts window 1300 may display names of contacts associated with contact information to be added. Get shared contacts window 1300 may also display a name of a sharing user (e.g., first user 110-1). As mentioned above, second user 110-2 may accept (i.e. confirm) receipt of the shared contact information, thereby copying the contact information to one or more address books belonging to second user 110-2, including address book 612-2. Get shared contacts window 1300 may also permit second user 110-2 to select only a portion of contacts to be accepted, rejecting the remainder. If second user 110-2 rejects all or a portion of the shared contacts, get shared contacts window 1300 may close. In certain embodiments, second user 110-2 may reopen get shared contacts window 1300 before the shared contacts expire (e.g., within thirty days) and the shared contacts may be accepted. In addition, a sharing user (e.g., first user 110-1) may receive a notification indicating whether second user 110-2 has accepted or rejected the shared contacts.

Figure 14:
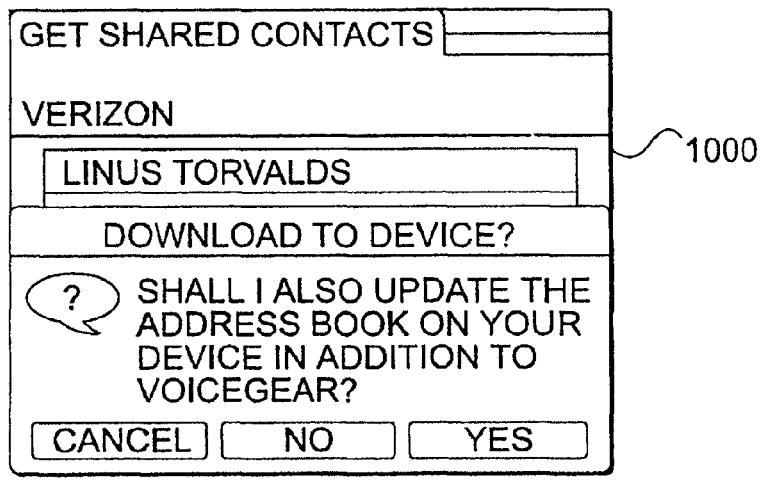
FIG. 14 is an exemplary screen view presented by a user terminal, consistent with the principals of the present invention.

FIG. 14 is an exemplary screen view presented by a user terminal to second user 110-2 after second user 110-2 has selected "accept" from get shared contacts window 1300. Download to device window 1000 may prompt second user 110-2 to update a locally stored address book with the shared contacts.

As an alternative or in addition to using the windows shown in FIGS. 12-14, users 110-1 and 110-2 may use telephone voice prompts to share contacts and to get shared contacts. For example, voice portal 412 may be equipped to prompt first user 110-1 to make the selections described above via voice network 104 and to forward the selections to service center 106. Voice portal 412 may also be equipped to prompt second user 110-2 to accept or reject shared contacts via voice network 104 and to forward the selected option to service center 106.

Figure 15:
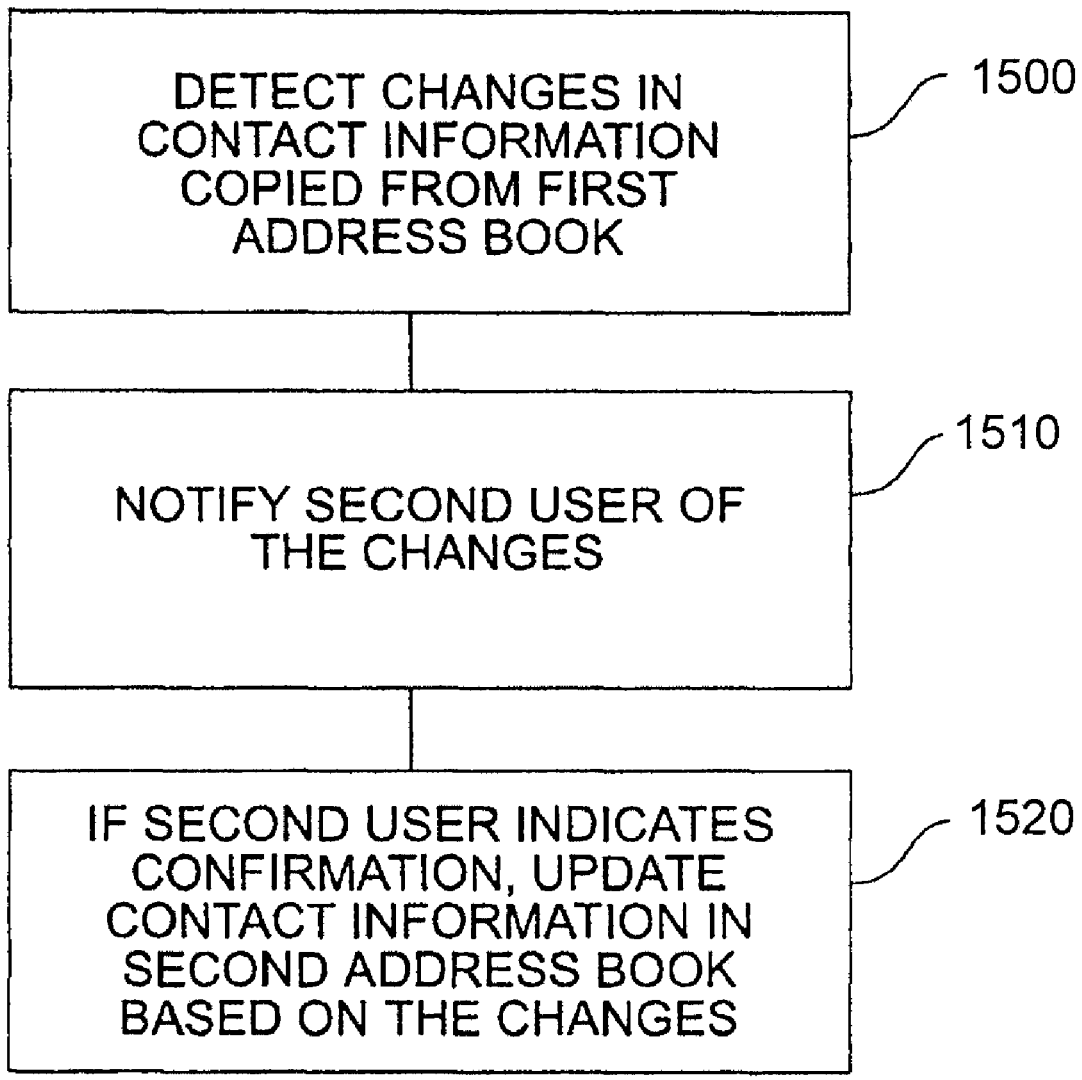
FIG. 15 is a flowchart depicting stages of an exemplary method consistent with certain embodiments of the present invention.

FIG. 15 is a flowchart depicting stages in another exemplary contact management process consistent with embodiments of the present invention. The illustrated process may begin after contact information has been copied from address book 612-1 (associated with first user 110-1) to address book 612-2 (associated with second user 110-2). First, any changes made to the copied contact information in address book 612-1 may be detected (stage 1500). Second user 110-2 may be notified of the changes (stage 1510). For example, second user 110-2 may be prompted by a notification from a user terminal (similar to user terminal 112) or a telephone to confirm whether the contact information in the second user's address book should be updated to reflect the changes. If confirmation is received, contact information in second address book 612-2 may then be updated to reflect the changes made in address book 612-1 (stage 1520). Alternatively, contact information in second address book 612-2 may be updated to reflect the changes automatically (i.e., without a notifying or receiving confirmation from second user 110-2). Application server function 516 and/or application server function 528 may perform the stages shown in FIG. 15.

In certain embodiments, adding or updating contact information in address book 612-2 may involve determining whether a contact associated with the contact information already exists in address book 612-2. Methods and systems of the present invention may determine whether a particular contact represents a new contact or one that was previously entered in address book 612-2. Application server function 516 and/or application server function 528 may perform such a determination. If the contact is found in address book 612-2 (i.e., the contact is not a new contact), the contact may not be added. In certain embodiments, however, second user 110-2 may be prompted (e.g., via a user terminal or a telephone) to indicate whether contact information corresponding to the selected contact found in address book 612-2 should be overwritten with the obtained contact information. If the contact represents a new contact, a new contact entry may be created and the obtained contact information associated with the contact may be added to address book 612-2, thereby adding the new contact to the address book.

The stages and screen views illustrated in FIGS. 7-9 and 11-15 are consistent with exemplary implementations of the instant invention. Further, it should be understood that the sequence of events described in FIGS. 7-9, 11, and 15 are exemplary and not intended to be limiting. Thus, other method steps may be used, and even with the methods depicted in FIGS. 7-9, 11, and 15, the particular order of events may vary without departing from the scope of the present invention. Moreover, certain stages may not be present and additional steps may be implemented in the processes illustrated in FIGS. 7-9, 11, and 15. For example, the illustrated processes may include additional stages corresponding to a user setting preferences and/or parameters associated with aspects of contact management, e.g., preferences that specify the manner in which contacts are added to address books 612. The illustrated processes may also include additional stages corresponding to a background thread running on user terminal 112 to check for share contact information requests from other users.

In addition, although the term "call" is used in connection with FIGS. 7-9, the processes represented by these figures are not limited to telephone or any other specific types of calls. As mentioned above, contacts may be added to address book 612 in response to communications received by and/or initiated from a plurality of varying devices associated with user 110. For example, source and/or destination parties associated with user's 110 cell phone, landline phone, facsimile, laptop, PDA, etc. may be added to address book 612.

Embodiments consistent with the invention may be implemented in various environments. Further, the processes described herein are not inherently related to any particular apparatus and may be implemented by any suitable combination of components. Moreover, various types of general purpose devices may be used in accordance with the teachings described herein.

The exemplary systems and methods consistent with present invention described above are illustrative rather than restrictive. Different combinations of hardware, software, and firmware may be suitable for practicing embodiments of the present invention. For example, in some embodiments, user terminal 112 and telephone 114 may be implemented as single combined device offering the features of each.

The present invention has been described in relation to particular examples which are intended in all respects to be illustrative rather than restrictive. Different combinations of hardware, software, and firmware may be suitable for practicing embodiments of the present invention.

Additionally, other embodiments of the invention will be apparent to those skilled in the art from consideration of the specification and practice of the preferred embodiments disclosed herein. It is intended that the specification and examples be considered as exemplary only. To this end, it is to be understood that inventive aspects lie in less than all features of a single foregoing disclosed embodiment, implementation, or configuration. Thus, the true scope and spirit of the invention depends on the following claims.

What is claimed is:

1. A method comprising:
maintaining a first address book associated with a first user and a second address book associated with a second user, the first address book including contact information for one or more third party parties;
receiving, from the first user, a request to copy the contact information from the first address book to the second address book;
determining that a subset of the contact information is marked as private;
forwarding, from the first user to the second user, the request to copy the contact information from the first address book to the second address book, the request excluding the subset of the contact information marked as private;
receiving a confirmation from the second user in response to the request, the confirmation including a selection of a portion of contacts from the contact information;
copying contact information for the selected portion of contacts from the first address book to the second address book in response to the confirmation, thereby providing the second user with access to the contact information for the one or more third party parties at the request of the first user; and
notifying at least one of the first and second users that contact information marked as private has not been copied from the first address book to the second address book.

2. The method of claim 1, wherein the first address book includes contact information associated with a plurality of contacts.

3. The method of claim 1, further comprising:
detecting changes in the contact information copied from the first address book; and
updating the contact information in the second address book based on the changes.

4. The method of claim 1, further comprising:
detecting changes in the contact information copied from the first address book;
notifying the second user of the changes; and if the second user indicates a confirmation in response to the notification, updating the contact information in the second address book based on the changes.

5. The method of claim 1, wherein the contact information is not copied unless the confirmation is received from the second user before expiration of a predetermined period of time.

6. A method comprising:
providing, at a user terminal, access to a central server configured to maintain a first address book and a second address book, the first address book being associated with a first user and the second address book being associated with a second user;
receiving, at the user terminal, a request from the first user to copy contact information for on or more third parties from the first address book to the second address book;
determining that a subset of the contact information is marked as private;
forwarding, to the second user, the request to copy contact information, the request not including the subset of the contact information marked as private;
receiving, at the user terminal, a confirmation that the request to copy the contact information from the first address book to the second address book is acceptable, the confirmation including a selection of a portion of contacts from the contact information;
sending instructions, from the user terminal to the central server, to copy the contact information for the selected portion of contacts from the first address book to the second address book in response to the confirmation, thereby providing the second user with access to the contact information for the one or more third parties at the request of the first user; and
notifying at least one of the first and second users that contact information marked as private has not been copied from the first address book to the second address book.

7. The method of claim 6, wherein the first address book includes contact information associated with a plurality of contacts.

8. The method of claim 7, further comprising:
detecting, at the central server, changes in the contact information copied from the first address book; and
updating the contact information in the second address book based on the changes.

9. The method of claim 6, further comprising:
detecting, at the central server, changes in the contact information copied from the second address book;
notifying the first user of the changes; and
if the first user indicates a confirmation in response to the notification, updating the contact information in the first address book based on the changes.

10. A computer-readable medium storing instructions for causing a computer to perform steps comprising:
providing access to a central server configured to maintain a first address book and a second address book, the first address book being associated with a first user and the second address book being associated with a second user;
receiving a request from the first user to copy contact information for one or more third party parties from the first address book to the second address book;
determining that a subset of the contact information is marked as private;
forwarding, to the second user, the request to copy contact information, the request not including the subset of the contact information marked as private;

receiving a confirmation that the request to copy the contact information from the first address book to the second address book is acceptable, the confirmation including a selection of a portion of contacts from the contact information;
sending instructions to the central server to copy the contact information for the selected portion of contacts from the first address book to the second address book in response to the confirmation, thereby providing the second user with access to the contact information for the one or more third parties at the request of the first user; and
notifying at least one of the first and second users that contact information marked as private has not been copied from the first address book to the second address book.

11. A system comprising:
a central server adapted to maintain a first address book associated with a first user and a second address book associated with a second user, the first address book including contact information for one or more third parties;
a first user terminal associated with the first user and adapted to forward, from the first user to the second user, a request to copy the contact information from the first address book to the second address book, the request excluding contact information marked as private based on a determination that a subset of the contact information is marked as private; and
a second user terminal associated with the second user and adapted to receive a confirmation from the second user in response to the request, the confirmation including a selection of a portion of contacts from the contact information;
wherein the central server is adapted to copy the contact information for the selected portion of contacts from the first address book to the second address book in response to the confirmation, thereby providing the second user with access to the contact information for the one or more third parties at the request of the first user; and
wherein the central server is further adapted to notify at least one of the first and second users that contact information marked as private has not been copied from the first address book to the second address book.

12. The system of claim 11, wherein the first address book includes contact information associated with a plurality of contacts.

13. The system of claim 11, wherein the central server is further adapted to:
detect changes in the contact information copied from the first address book;
notify the second user of the changes; and
update the contact information in the second address book based on the changes if the second user indicates a confirmation in response to the notification.

14. The system of claim 11, wherein the central server does not copy the contact information unless the confirmation is received from the second user before expiration of the predetermined period of time.

15. A computer-readable medium storing instructions for causing a computer to perform steps comprising:
maintaining a first address book associated with a first user and a second address book associated with a second user, the first address book including contact information for one or more third parties;

receiving, from the first user, a request to copy the contact information for the from the first address book to the second address book;
determining that a subset of the contact information is marked as private;
forwarding, from the first user to the second user, the request to copy the contact information from the first address book to the second address book, the request excluding the subset of the contract information marked as private;
receiving a confirmation from the second user in response to the request, the confirmation including a selection of a portion of contacts from the contact information;

copying contact information for the selected portion of contacts from the first address book to the second address book in response to the confirmation, thereby providing the second user with access to the contact information for the one or more third parties at the request of the first user; and
notifying at least one of the first and second users that contact information marked as private has not been copied from the first address book to the second address book.

\* \* \* \* \*